US011256941B2

United States Patent
Hwang et al.

(10) Patent No.: US 11,256,941 B2
(45) Date of Patent: Feb. 22, 2022

(54) METHOD FOR CONTROLLING OPERATION OF IRIS SENSOR AND ELECTRONIC DEVICE THEREFOR

(71) Applicant: Samsung Electronics Co., Ltd., Gyeonggi-do (KR)

(72) Inventors: Sang-Min Hwang, Gyeonggi-do (KR); Hee-Jun Choi, Chungcheongnam-do (KR); Yoo-Mi Tak, Gyeonggi-do (KR); Woo-Yong Lee, Gyeonggi-do (KR); Jeong-Ho Cho, Gyeonggi-do (KR); Jeong-Min Park, Gyeonggi-do (KR); Ki-Huk Lee, Gyeonggi-do (KR); Cheol-Ho Cheong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 762 days.

(21) Appl. No.: 16/076,093

(22) PCT Filed: Jul. 28, 2017

(86) PCT No.: PCT/KR2017/008187
§ 371 (c)(1),
(2) Date: Aug. 7, 2018

(87) PCT Pub. No.: WO2018/026142
PCT Pub. Date: Feb. 8, 2018

(65) Prior Publication Data
US 2021/0192249 A1    Jun. 24, 2021

(30) Foreign Application Priority Data
Aug. 1, 2016   (KR) .................. 10-2016-0098233

(51) Int. Cl.
*G06K 9/20*    (2006.01)
*G06K 9/00*    (2022.01)
(Continued)

(52) U.S. Cl.
CPC ....... *G06K 9/2027* (2013.01); *G06K 9/00604* (2013.01); *G06K 9/00912* (2013.01);
(Continued)

(58) Field of Classification Search
CPC ............. G06K 9/2027; G06K 9/00604; G06K 9/00912; G06K 9/4652; H04M 1/0279; H04M 2250/12; H04M 2250/52
See application file for complete search history.

(56) References Cited

U.S. PATENT DOCUMENTS

| 7,747,160 | B2 | 6/2010 | Thorn |
| 10,715,997 | B2 * | 7/2020 | Yu .......................... H04W 12/08 |

(Continued)

FOREIGN PATENT DOCUMENTS

| CN | 105787435 A | 7/2016 |
| CN | 105809139 A | 7/2016 |

(Continued)

OTHER PUBLICATIONS

Chinese Search Report dated Jan. 6, 2020.
(Continued)

*Primary Examiner* — Christopher M Brandt
(74) *Attorney, Agent, or Firm* — Cha & Reiter, LLC

(57) ABSTRACT

An electronic device according to one example of the present invention comprises: a proximity sensor for generating proximity information on an object which approaches the electronic device; an iris sensor for detecting an iris; and a first processor for controlling the electronic device, wherein the first processor can be set to: determine the distance between the electronic device and the object on the basis of the proximity information generated by the proximity sensor; detect the iris by using the iris sensor when the distance between the electronic device and the object is greater than a first reference value; and inactivate the iris
(Continued)

sensor when the distance between the electronic device and the object is less than or equal to the first reference value. In addition, other examples are possible.

19 Claims, 20 Drawing Sheets

(51) Int. Cl.
*G06K 9/46* (2006.01)
*H04M 1/02* (2006.01)

(52) U.S. Cl.
CPC ........ *G06K 9/4652* (2013.01); *H04M 1/0279* (2013.01); *H04M 2250/12* (2013.01); *H04M 2250/52* (2013.01)

(56) References Cited

U.S. PATENT DOCUMENTS

| | | | |
|---|---|---|---|
| 2011/0248151 | A1 | 10/2011 | Holcombe et al. |
| 2012/0242820 | A1* | 9/2012 | Hanna ................. G06K 9/00597 348/78 |
| 2013/0293457 | A1* | 11/2013 | Yoon ........................ G06F 3/011 345/156 |
| 2015/0253886 | A1 | 9/2015 | Wei et al. |
| 2016/0012218 | A1* | 1/2016 | Perna ................... G06F 16/5838 726/18 |
| 2016/0259462 | A1* | 9/2016 | Liao ....................... H04M 15/93 |
| 2016/0284091 | A1* | 9/2016 | Sarangdhar ............ G01B 11/14 |
| 2017/0019577 | A1 | 1/2017 | Tan et al. |
| 2017/0277950 | A1 | 9/2017 | Sung et al. |

FOREIGN PATENT DOCUMENTS

| | | |
|---|---|---|
| JP | 2005-327161 A | 11/2005 |
| JP | 2009-211597 A | 9/2009 |
| KR | 2000-0002734 A | 1/2000 |
| KR | 10-2004-0081895 A | 9/2004 |
| KR | 10-0547333 B1 | 1/2006 |
| KR | 10-2012-0127560 A | 11/2012 |
| KR | 10-2013-0123859 A | 11/2013 |
| KR | 10-1433788 B1 | 8/2014 |
| WO | 2013/032635 A1 | 3/2013 |
| WO | 2016/035901 A1 | 3/2016 |
| WO | 2018/056731 A1 | 3/2018 |

OTHER PUBLICATIONS

"Principles of optical proximity sensors"; Dec. 31, 2008; XP055515338; http://www.pc-control.co.uk/Optical.hlm.

Abramovich, et al.; "LED eye safety considerations in the design of iris capture systems"; 2011; General Electric Global Research Center.

European Search Report dated Oct. 23, 2018.

Czuszynski, et al.; "Interactions using passive optical proximity detector"; 2015 8th International Conference on Human System Interaction; Jun. 25, 2015; XP033184779.

"iCAM7100S Series Hardware Guide Packing List Required Equipment"; IRIS ID; Dec. 31, 2015; XP055572977.

"Fingertip Proximity Sensor with Realtime Visual-based Calibration"; RSJ International Conference on Intelligent Robots and Systems; 2016; XP033011401.

European Search Report dated Apr. 8, 2019.

* cited by examiner

METHOD FOR CONTROLLING OPERATION OF IRIS SENSOR AND ELECTRONIC DEVICE THEREFOR

CROSS-REFERENCE TO RELATED APPLICATION(S)

This application is a National Phase Entry of PCT International Application No. PCT/KR2017/008187, which was filed on Jul. 28, 2017, and claims priority to Korean Patent Application No. 10-2016-0098233, which was filed on Aug. 1, 2016, the contents of which are incorporated herein by reference.

BACKGROUND

1. Field

Various embodiments of the present disclosure relate to an electronic device including an iris sensor.

2. Description of the Related Art

The recent astounding progress in information and communication technologies, semiconductor technologies, and so forth has increased the spread and use of various portable terminals. Specifically, recent portable terminals have reached a mobile convergence stage of encompassing areas of other types of user equipment without being confined to their traditional unique areas. In the case of a mobile communication device, for example, in addition to general communication functions such as a voice call and an message transmission and reception, various functions are widely used such as TV watching (e.g., mobile broadcasting like digital multimedia broadcasting (DMB) or digital video broadcasting (DVB), a music play function (e.g., MPEG audio layer-3 (MP3) player), a photographing function, an Internet connecting function, and the like.

Recent portable terminals may be implemented by including a sensor capable of measuring a distance between the portable terminal and an object. To measure a distance of the portable terminal to the object, the portable terminal may irradiate light to the object using an infrared (IR) LED and use the amount of light reflected from the object. The portable terminal may also measure the distance thereof to the object by using an ultrasonic sensor or a laser sensor.

SUMMARY

The portable terminal may reinforce security thereof by using an iris recognition technology with an iris sensor. To accurately recognize the iris, it is desirable to use the iris sensor including a high-power IR LED. However, as the intensity of light output from the iris sensor increases, the light may have a negative influence upon user's eyes that may be damaged when being exposed to the light output from the iris sensor for a long time.

Therefore, various embodiments of the present disclosure provide an electronic device including an iris sensor and a method for controlling an operation of the iris sensor, in which eye's fatigue and damage caused by the iris sensor may be prevented.

An electronic device according to an embodiment of the present disclosure includes a proximity sensor configured to generate proximity information about an object approaching the electronic device; an iris sensor configured to detect an iris; and a first processor configured to control the electronic device, wherein the first processor is further configured to: determine a distance between the electronic device and the object based on the proximity information generated by the proximity sensor, and if the distance between the electronic device and the object is greater than a first reference value, detect the iris by using the iris sensor, and if the distance between the electronic device and the object is less than or equal to the first reference value, deactivate the iris sensor.

A method for controlling an operation of an electronic device according to an embodiment of the present disclosure may include generating proximity information about an object approaching the electronic device by using a proximity sensor; determining a distance between the electronic device and the object based on the proximity information generated by the proximity sensor; and if the distance between the electronic device and the object is greater than a first reference value, detecting the iris by using an iris sensor, and if the distance between the electronic device and the object is less than or equal to the first reference value, deactivating the iris sensor.

In a storage medium having stored therein instructions for, when executed by at least one processor, causing the at least one processor to perform at least one operation according to an embodiment of the present disclosure, the at least one operation includes generating proximity information about an object approaching an electronic device by using a proximity sensor of the electronic device, determining a distance between the electronic device and the object based on the proximity information generated by the proximity sensor, and if the distance between the electronic device and the object is greater than a first reference value, detecting the iris by using an iris sensor of the electronic device, and if the distance between the electronic device and the object is less than or equal to the first reference value, deactivating the iris sensor.

A portable electronic device according to an embodiment of the present disclosure includes a housing, a touch screen display exposed through a surface of the housing, a proximity sensor arranged in adjacent to the display on the surface of the housing, an iris recognition sensor arranged in adjacent to the proximity sensor on the surface of the housing, a cellular wireless communication circuit arranged inside the housing, a processor electrically connected with the display, the proximity sensor, the iris recognition sensor, and the communication circuit, and a memory storing at least one application program for performing authentication by using the iris recognition sensor, in which the memory stores instructions for, when executed, causing the proximity sensor to determine whether an external object is in proximity based on a first distance to the proximity sensor when the processor performs authentication by using the iris recognition sensor during an operation of the application program, and causing the proximity sensor to determine whether the external object is in proximity based on the first distance from the proximity sensor when the processor performs phone communication by using the wireless communication circuit, and the first distance is greater than the second distance.

According to various embodiments of the present disclosure, there may be provided an electronic device including an iris sensor and a method for controlling an operation of the iris sensor, in which eye's fatigue and damage caused by the iris sensor may be prevented.

DETAILED DESCRIPTION

Figure 1:
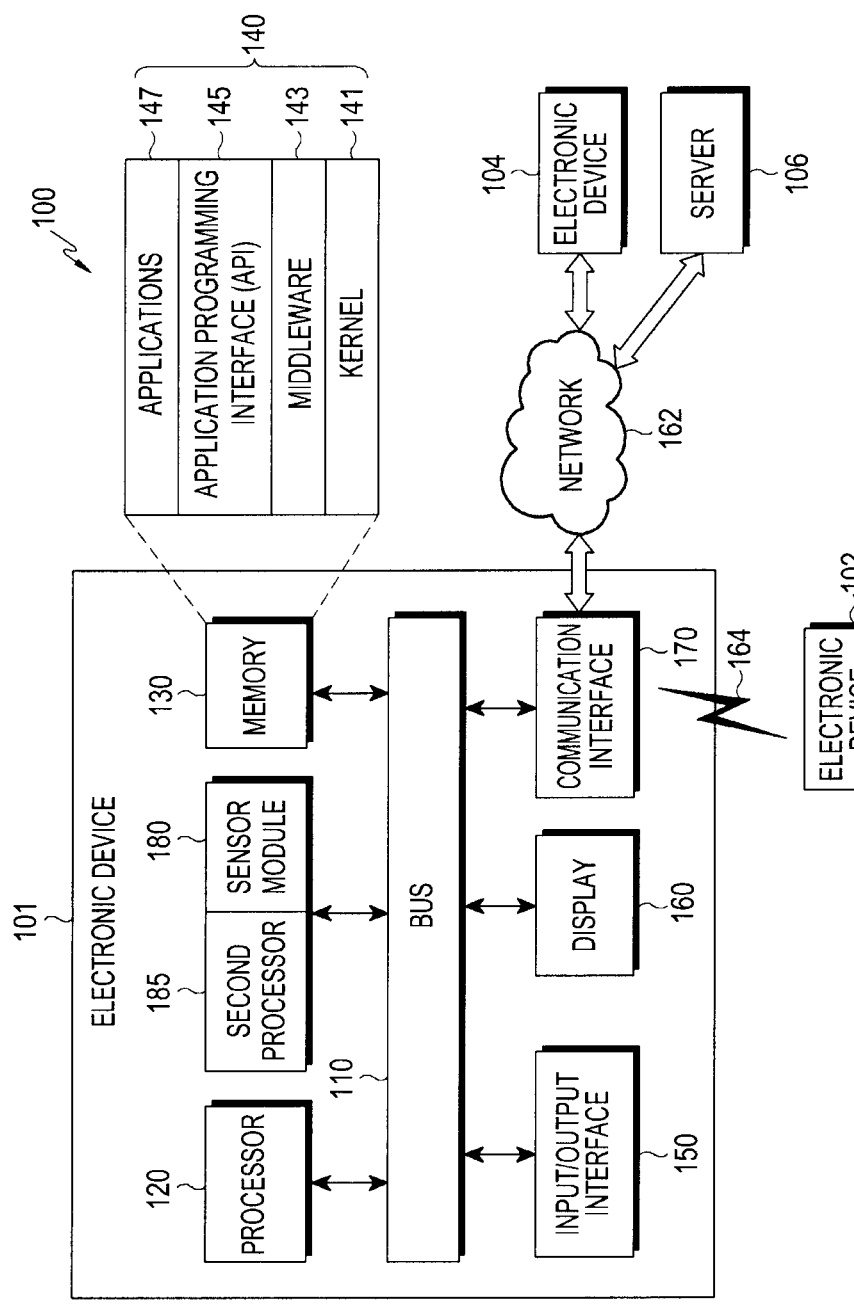
FIG. 1 is a block diagram of an electronic device in a network environment according to various embodiments.

Hereinafter, various embodiments of the present disclosure will be disclosed with reference to the accompanying drawings. However, embodiments and terms used therein are not intended to limit the present disclosure to particular embodiments, and it should be construed as including various modifications, equivalents, and/or alternatives according to the embodiments of the present disclosure. With regard to the description of the drawings, similar reference numerals may be used to refer to similar or related elements. The singular forms are intended to include the plural forms as well, unless the context clearly indicates otherwise. In the present disclosure, an expression such as "A or B", "at least one of A or/and B", or "one or more of A or/and B" may include all possible combinations of together listed items. Expressions such as "first", "second", "primarily", or "secondary", used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for", "having the capacity to", "adapted to", "made to", "capable of", or "designed to" according to a situation. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device. A term "configured to (or set)" does not always mean only "specifically designed to" by hardware.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, and a wearable device. Examples of the wearable device may include at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implanted type (e.g., an implantable circuit, etc.), and so forth. In some embodiments, the electronic device may include, for example, a television (TV), a Digital Video Disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., HomeSync™ of Samsung, TV™ of Apple, or TV™ of Google), a game console, an electronic dictionary, an electronic key, a camcorder, and an electronic frame.

In other embodiments, the electronic device may include at least one of various medical equipment (for example, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a point of sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth). According to some embodiments, the electronic device may include a part of a furniture, building/structure or a part of a vehicle, an electronic board, an electronic signature receiving device, a projector, and various measuring instruments (e.g., a water, electricity, gas, electric wave measuring device, etc.). According to various embodiments, the electronic device may be flexible or may be a combination of two or more of the above-described various devices. According to an embodiment of the disclosure, the electronic devices are not limited to those described above. Herein, the term "user" used in various embodiments of the present disclosure may refer to a person who uses the electronic device or a device using the electronic device.

FIG. 1 illustrates an electronic device 101 in a network environment 100 according to various embodiments of the present disclosure.

Referring to FIG. 1, the electronic device 101 may include a bus 110, a first processor 120, a memory 130, an input/output (I/O) interface 150, a display 160, a communication interface 170, and a sensor module 180. According to an embodiment, the electronic device 101 may further include a separate processor, for example, a second processor 185, for controlling the sensor module 180. According to some embodiments, the electronic device 101 may omit at least one of the foregoing elements or may further include other elements.

The bus 110 may include a circuit for connecting, e.g., the elements 120 to 180 and 185 and delivering communication (e.g., a control message or data) between the elements.

The first processor 120 may include one or more of a central processing unit (CPU), an application processor (AP), and a communication processor (CP). The first processor 120 may perform an operation or data processing for control and/or communication of at least one other elements (e.g., the bus 110, the memory 130, the I/O interface 150, the display 160, the communication interface 170, etc.) of the electronic device 101.

According to an embodiment, when an event for activating the iris sensor occurs, the first processor 120 may control the electronic device 101 to measure a distance between an object approaching the electronic device 101 and the electronic device 101 by activating a proximity sensor before activating the iris sensor. The first processor 120 determines whether the distance between the object and the electronic device 101 is greater than a first reference value. When the distance between the object and the electronic device 101 is greater than the first reference value (e.g., 20 cm), the first processor 120 activates the iris sensor to detect the user's iris. When the distance between the object and the electronic device 101 is less than or equal to the first reference value, the first processor 120 deactivates the iris sensor. As such, the user's iris is not obtained when the distance between the user's iris and the electronic device 101 is less than or equal to the first reference value, such that the electronic device 101 may prevent the user's iris from being damaged by light output from the iris sensor, for example, infrared light output from a light-emitting unit (e.g., an infrared (IR) light emitting diode (LED)) of the iris sensor.

According to an embodiment, an event for activating the iris sensor may correspond to, for example, a case where the electronic device 101 is released from a sleep mode, enters a lock mode, receives a user input for activating the iris sensor, or needs user authentication. Even when the event for activating the iris sensor occurs, the first processor 120 may maintain a turn-off state of the iris sensor, particularly, the light-emitting unit (e.g., the IR LED). Thus, the electronic device 101 may prevent user's eyes from being damaged by light output from the light-emitting unit.

According to an embodiment, the first processor 120 determines whether the distance between the object and the electronic device 101 is less than a second reference value (e.g., 3 cm). When the distance between the object and the electronic device 101 is greater than or equal to the second reference value, the first processor 120 may maintain a turn-on state of the display 160. When the distance between the object and the electronic device 101 is less than the second reference value, the first processor 120 may turn off the display 160.

The memory 130 may include a volatile and/or nonvolatile memory. The memory 130 may store, for example, instructions or data associated with at least one other elements of the electronic device 101. According to an embodiment, the memory 130 stores the first reference value or the second reference value for determining whether the object approaches the electronic device 101 by using the proximity sensor.

According to an embodiment, the memory 130 may store software and/or a program 140. The program 140 may include at least one of, for example, a kernel 141, middleware 143, an application programming interface (API) 145, and/or an application program (or "application") 147, and the like. At least some of the kernel 141, the middleware 143, and the API 145 may be referred to as an operating system (OS). The kernel 141 may control or manage, for example, system resources (e.g., the bus 110, the first processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141. In addition, the middleware 143 may process one or more task requests received from the application program 147 based on priorities. For example, the middleware 143 may give a priority for using a system resource (e.g., the bus 110, the first processor 120, the memory 130, etc.) of the electronic device 101 to at least one of the application programs 147, and may process the one or more task requests. The API 145 is an interface used for the application 147 to control a function provided by the kernel 141 or the middleware 143, and may include, for example, at least one interface or function (e.g., an instruction) for file control, window control, image processing or character control.

The I/O interface 150 may deliver, for example, an instruction or data input from a user or another external device to other component(s) of the electronic device 101, or output an instruction or data received from other component(s) of the electronic device 101 to a user or another external device. According to an embodiment, the I/O interface 150 receives a user input for activating the iris sensor.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, video, an icon, and/or a symbol, etc.) to users. The display 160 may include a touch screen, and receives a touch, a gesture, proximity, or a hovering input, for example, by using an electronic pen or a part of a body of a user. According to an embodiment, the display 160 receives the user input for activating the iris sensor, and when a distance between the electronic device 101 and a user's iris is equal to a first distance, the display 160 displays guide data under control of the first processor 120 such that the distance between the electronic device 101 and the user's iris is equal to a second distance.

The communication interface 170 establishes communication between the electronic device 101 and an external device (e.g., a first external electronic device 102, a second external electronic device 104, or a server 106). For example, the communication interface 170 may be connected to a network 162 through wireless communication or wired communication to communicate with an external device (e.g., the second external electronic device 104 or the server 106). According to an embodiment, under control of the first processor 120, the communication interface 170 receives a threshold value for proximity determination by the proximity sensor from the server 106.

The wireless communication may include cellular communication using at least one of Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM)). According to an embodiment, the wireless communication may include at least one of Wireless Fidelity (WiFi), Bluetooth, Bluetooth Low Energy (BLE), Zigbee, near field communication (NFC), magnetic secure transmission (MST), radio frequency (RF), and a body area network (BAN). According to an embodiment, the wireless communication may include GNSS. The GNSS may include, for example, at least one of a global positioning system (GPS), a global navigation satellite system (Glonass), a Beidou navigation satellite system ("Beidou"), and Galileo, the European global satellite-based navigation system. Hereinbelow, "GPS" may be used interchangeably with "GNSS". The wired communication may include, for example, at least one of USB, HDMI, RS-232, power line communication, and POTS. The network 162 may include a telecommunications network, for example, at least one of a computer network (e.g., a local area network (LAN) or a wide area network (WAN)), Internet, and a telephone network.

The sensor module 180 measures physical quantity or senses an operation state of the electronic device 101 to convert the measured or sensed information into an electric signal, and delivers the electric signal to the first processor 120 or the second processor 185. According to an embodiment, the sensor module 180 may include a proximity sensor or an iris sensor. The proximity sensor may be used to determine whether an object approaches the electronic device 101, and the iris sensor may recognize an iris of a user who uses the electronic device 101.

According to an embodiment, the proximity sensor may include a light-emitting unit and a light-receiving unit, in which the light-emitting unit may include an IR LED and the light-receiving unit may include a photo diode.

According to an embodiment, the electronic device 101 may include a separate processor, for example, the second processor 185, for controlling the sensor module 180. The second processor 185 receives the electric signal generated by the sensor module 180 and controls the sensor module 180 based on the electric signal. The second processor 185 delivers information associated with the electric signal generated by the sensor module 180 (for example, information indicating whether the object approaches, measured by the proximity sensor, an iris image recognized by the iris sensor, etc.) to the first processor 120.

According to an embodiment, the second processor 185 may be implemented in a form included in the first processor 120. When the second processor 185 is implemented in a form included in the first processor 120, the sensor module 180 may be controlled by the first processor 120, and the electric signal generated by the sensor module 180 may be delivered to the first processor 120.

Each of the first external electronic device 102 and the second external electronic device 104 may be a device of the same type as or a different type than the electronic device 101. According to various embodiments of the present disclosure, some or all of operations performed by the electronic device 101 may be performed in another electronic device or a plurality of electronic devices (e.g., the electronic device 102 or 104, or the server 106). According to an embodiment of the present disclosure, when the electronic device 101 has to perform a function or a service automatically or at a request, the electronic device 101 may request another device (e.g., the electronic devices 102 or 104 or the server 106) to perform at least some functions associated with the function or the service instead of or in addition to executing the function or the service. The other electronic device (e.g., the electronic device 102 or 104 or the server 106) may execute a function requested by the electronic device 101 or additional function and deliver the execution result to the electronic device 101. The electronic device 101 may then process or further process the received result to provide the requested function or service. To this end, for example, cloud computing, distributed computing, or client-server computing may be used.

Figure 2:
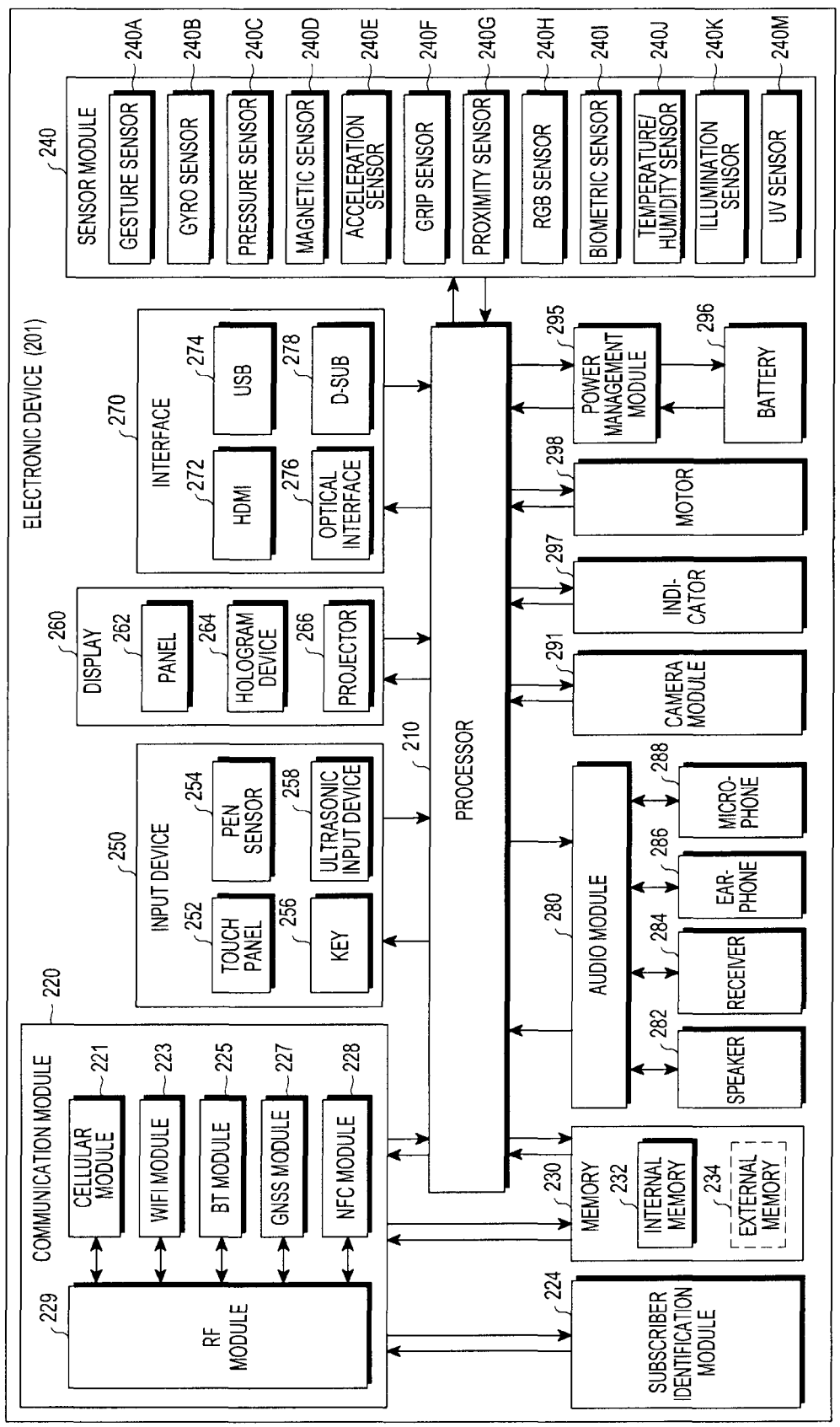
FIG. 2 is a block diagram of an electronic device according to various embodiments.

FIG. 2 is a block diagram of an electronic device according to various embodiments of the present disclosure;

Referring to FIG. 2, the electronic device 201 may include the entire electronic device 101 illustrated in FIG. 1 or a part thereof. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 controls multiple hardware or software components connected to the processor 210 by driving an Operating System (OS) or an application program, and performs processing and operations with respect to various data. The processor 210 may be implemented with, for example, a system on chip (SoC). According to an embodiment of the present disclosure, the server 210 may include a GPU and/or an image signal processor. The processor 210 may include at least some of the elements illustrated in FIG. 2 (e.g., the cellular module 221). The processor 210 loads a command or data received from at least one of other elements (e.g., a non-volatile memory) into a volatile memory to process the command or data, and stores result data in the non-volatile memory.

The communication module 220 may have a configuration that is the same as or similar to the communication interface 170. The communication module 220 may include, for example, the cellular module 221, a WiFi module 223, a Bluetooth (BT) module 225, a GNSS module 227, a near field communication (NFC) module 228, and a radio frequency (RF) module 229. The cellular module 221 may provide, for example, a voice call, a video call, a text service, or an Internet service over a communication network. According to an embodiment, the cellular module 221 identifies and authenticates the electronic device 201 in a communication network by using the SIM 224 (e.g., a SIM card). According to an embodiment, the cellular module 221 performs at least one of functions that may be provided by the processor 210. According to an embodiment, the cellular module 221 may include a communication processor (CP). According to an embodiment, at least some (e.g., two or more) of the cellular module 221, the WiFi module 223, the BT module 225, the GNSS module 227, and the NFC module 228 may be included in one integrated chip (IC) or IC package. The RF module 229 may, for example, transmit and receive a communication signal (e.g., an RF signal). The RF module 229 may include a transceiver, a power amp module (PAM), a frequency filter, a low noise amplifier (LNA), or an antenna. According to another embodiment, at least one of the cellular module 221, the WiFi module 223, the BT module 225, the GNSS module 227, and the NFC module 228 may transmit and receive an RF signal through the separate RF module. The SIM 224 may, for example, include a card including an SIM or an embedded SIM, and may include unique identification information (e.g., an integrated circuit card identifier (ICCID) or subscriber information (e.g., an international mobile subscriber identity (IMSI)).

The memory 230 (e.g., the memory 130) may, for example, include an internal memory 232 and/or an external memory 234. The internal memory 232 may, for example, include at least one of a volatile memory (e.g., dynamic random access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, a flash memory, and a solid state drive (SSD). The external memory 234 may further include flash drive, for example, compact flash (CF), secure digital (SD), micro-SD, mini-SD, extreme Digital (xD), a multi-media card (MMC), or a memory stick. The external memory 234 may be functionally or physically connected with the electronic device 201 through various interfaces.

The sensor module 240 measures physical quantity or senses an operation state of the electronic device 201 to convert the measured or sensed information into an electric signal. The sensor module 240 may include, for example, at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illumination sensor 240K, and a ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 240 may further include a control circuit for controlling at least one sensor included therein. In some embodiments, the electronic device 201 may further include a processor configured to control the sensor module 240 as part of or separately from the processor 210, to control the sensor module 240 during a sleep state of the processor 210.

The input device 250 may include, for example, a touch panel 252, a (digital) pen sensor 254, a key 256, or an ultrasonic input device 258. The touch panel 252 may use at least one of a capacitive type, a resistive type, an IR type, or an ultrasonic type. The touch panel 252 may further include a control circuit. The touch panel 252 may further include a tactile layer to provide tactile reaction to the user. The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated by an input means through a microphone (e.g., the microphone 288) and checks data corresponding to the sensed ultrasonic waves.

The display 260 (e.g., the display 160) may include a panel 262, a hologram device 264, a projector 266, and/or a control circuit for controlling them. The panel 262 may be implemented to be flexible, transparent, or wearable. The panel 262 may be configured with the touch panel 252 in one module. According to an embodiment, the panel 262 may include a pressure sensor (or a "force sensor", interchangeably used hereinafter) capable of measuring a strength of a pressure by a user's touch. The pressure sensor may be implemented integrally with the touch panel 252 or may be implemented as one or more sensors separate from the touch panel 252. The hologram device 264 shows a stereoscopic image in the air by using interference of light. The projector 266 displays an image onto a screen through projection of light. The screen may be positioned inside or outside the electronic device 201. The interface 270 may include an HDMI 272, a universal serial bus (USB) 274, an optical communication 276, or a D-subminiature 278. The interface 270 may be included in the communication interface 170 illustrated in FIG. 1. Additionally or alternatively, the interface 270 may include, for example, an MHL interface, an SD card/MMC interface, or an IrDA standard interface.

The audio module 280 bi-directionally converts sound and an electric signal. At least some element of the audio module 280 may be included, for example, in the I/O interface 150 illustrated in FIG. 1. The audio module 280 processes sound information input or output through the speaker 282, the receiver 284, the earphone 286, or the microphone 288. The camera module 291 is, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.). The power management module 295 manages power of the electronic device 201. According to an embodiment, the power management module 295 may include a power management integrated circuit (PMIC), a charger IC, or a battery fuel gauge. The PMIC may have a wired and/or wireless charging scheme. The wireless charging scheme includes a magnetic-resonance type, a magnetic induction type, and an electromagnetic type, and may further include an additional circuit for wireless charging, for example, a coil loop, a resonance circuit, or a rectifier. The battery gauge measures the remaining capacity of the battery 296 or the voltage, current, or temperature of the battery 296 during charging. The battery 296 may include, for example, a rechargeable battery and/or a solar battery.

The indicator 297 displays a particular state, for example, a booting state, a message state, or a charging state, of the electronic device 201 or a part thereof (e.g., the processor 210). The motor 298 converts an electric signal into mechanical vibration or generates vibration or a haptic effect. The electronic device 201 may include a device for supporting the mobile TV (e.g., a GPU) to process media data according to a standard such as digital multimedia broadcasting (DMB), digital video broadcasting (DVB), or mediaFlo™. Each of the foregoing elements described herein may be configured with one or more components, names of which may vary with a type of the electronic device. In various embodiments, some components of the electronic device (e.g., the electronic device 201) may be omitted or may further include other elements, and some of the components may be coupled to form one entity and identically perform functions of the components before being coupled.

Figure 3:
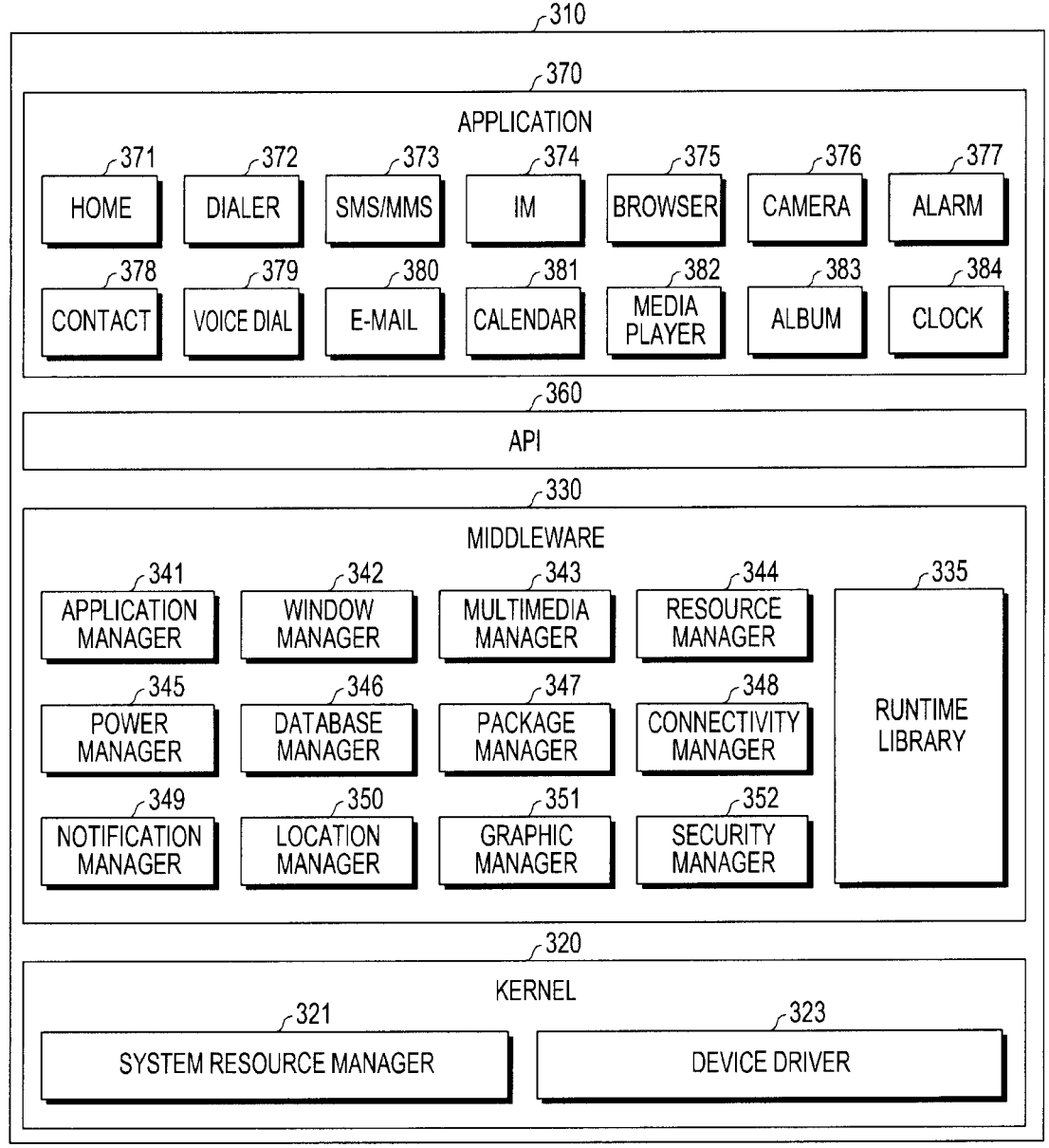
FIG. 3 is a block diagram of a programming module according to various embodiments.

FIG. 3 is a block diagram of a programming module according to various embodiments.

According to an embodiment, a programming module 310 (e.g., the program 140) may include an OS for controlling resources associated with an electronic device (e.g., the electronic device 101) and/or various applications (e.g., the application program 147) executed on the OS. The OS may include Android™, iOS™, Windows, Symbian™, Tizen™, or Bada™. Referring to FIG. 3, the programming module 310 may include a kernel 320 (e.g., the kernel 141), middleware 330 (e.g., the middleware 143), an application programming interface (API) 360 (e.g., the API 145), and/or an application 370 (e.g., the application program 147). At least a part of the programming module 310 may be preloaded on an electronic device or may be downloaded from an external device (e.g., the vehicle device 102, the electronic device 104, or the server 106).

The kernel 320 may include a system resource manager 321 and/or a device driver 323. The system resource manager 321 may perform control, allocation, retrieval of system resources, and so forth. According to an embodiment, the system resource manager 321 may include a process management unit, a memory management unit, or a file system management unit. The device driver 323 may include, for example, a display driver, a camera driver, a Bluetooth driver, a shared memory driver, a USB driver, a keypad driver, a WiFi driver, an audio driver, or an inter-process communication (IPC) driver. The middleware 330 may include provide functions that the application 370 commonly requires or provide various functions to the application 370 through the API 360 to allow the application 370 to use a limited system resource in an electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 performs input/output management, memory management, or calculation function processing. The application manager 341 manages a life cycle of the applications 370. The window manager 342 manages a GUI resource used in a screen. The multimedia manager 343 recognizes a format necessary for playing media files and performs encoding or decoding on a media file by using a codec appropriate for a corresponding format. The resource manager 344 manages a source code or a memory space of the applications 370. The power manager 345 manages a battery or power and provides power information necessary for an operation of the electronic device. According to an embodiment, the power manager 345 may operate with basic input/output system (BIOS). The database manager 346 generates, searches or changes a database used for at least one application among the applications 370. The package manager 347 manages the installation or update of an application distributed in a package file format.

The connectivity manager 348 manages, for example, a wireless connection. The notification manager 349 provides an event, e.g., an arriving message, an appointment, proximity notification, etc. The location manager 350 manages, for example, location information of an electronic device. The graphic manager 351 manages, for example, a graphic effect to be provided to a user or a user interface relating thereto. The security manager 352 provides, for example, system security or user authentication. According to an embodiment, the middleware 330 may further include a telephony manager for managing a voice or video call function of the electronic device or a middleware module forming a combination of functions of the above-described components. According to an embodiment, the middleware 330 provides a module specified for each type of an OS. Additionally, the middleware 330 may delete some of existing elements or add new elements dynamically. The API 360 may be provided as a set of API programming functions with a different configuration according to the OS. In the case of Android or iOS, for example, one API set may be provided by each platform, and in the case of Tizen, two or more API sets may be provided.

The application 370 may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring an exercise amount, a blood sugar, etc.), or an environment information providing application (e.g., an application for providing air pressure, humidity, or temperature information or the like). According to an embodiment, the application 370 may include an information exchange application supporting information exchange between the electronic device and an external electronic device. The information exchange application may include, for example, a notification relay application for transferring specific information to the external electronic device or a device management application for managing the external electronic device. For example, the notification relay application may deliver notification information generated in another application of the electronic device to an external electronic device or may receive notification information from the external electronic device and provide the notification information to the user. The device management application may manage (e.g., install, remove, or update) a function (e.g., turn on/turn off of an external electronic device itself (or a part thereof) or control of brightness (or resolution) of a display) of an external device communicating with the electronic device, a service provided by an application operating in an external electronic device or provided by the external electronic device (e.g., a call service or a message service). According to an embodiment, the application 370 may include an application (e.g., device health care application of mobile medical equipment) designated according to an attribute of the external electronic device. According to an embodiment, the application 370 may include an application received from the external electronic device. The at least a part of the programming module 310 may be implemented (e.g., executed) by software, firmware, hardware (for example, the processor 210), or a combination of two or more of them, and may include, for example, modules, programs, routines, sets of instructions, or processes for performing one or more functions.

Figure 4:
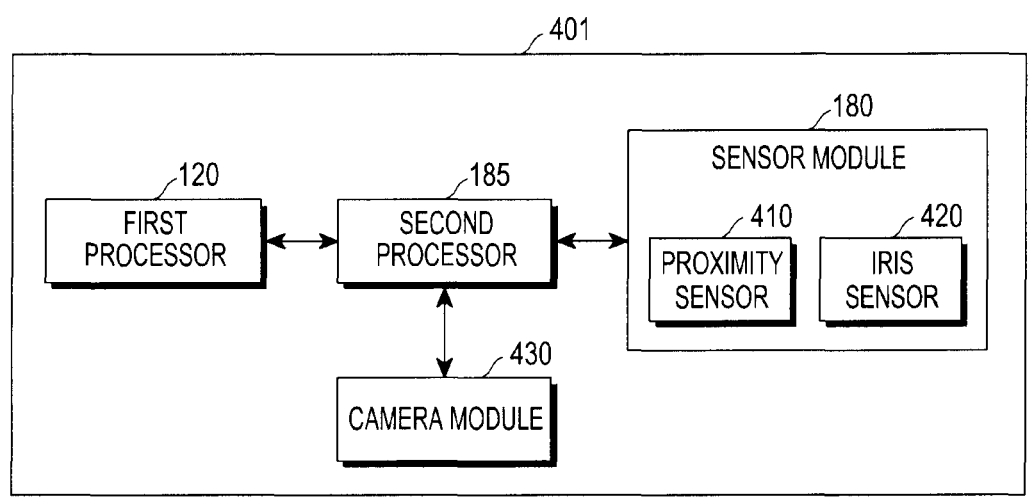
FIG. 4 is a block diagram of an example of an electronic device according to various embodiments.

FIG. 4 is a block diagram of an example of an electronic device according to various embodiments.

Referring to FIG. 4, an electronic device 401 (for example, the electronic device 101) may include the first processor 120, the second processor 185, and the sensor module 180 that includes the proximity sensor 410 or the iris sensor 420, and may further include a camera module 430.

The first processor 120 performs operations or data processing for control and/or communication of at least one other elements of the electronic device 401 as described above with reference to FIG. 1. When an event for activating the iris sensor 420 occurs, the first processor 120 may control the proximity sensor 410 to measure a distance between an object approaching the electronic device 401 and the electronic device 401 by activating the proximity sensor 410 before activating the iris sensor 420. The first processor 120 controls an operation of the iris sensor 420 based on the distance measured by the proximity sensor 410.

The second processor 185 receives the electric signal generated by the sensor module 180, for example, the proximity sensor 410 or the iris sensor 420, and controls the sensor module 180 based on the electric signal, as described above with reference to FIG. 1. The second processor 185 delivers, for example, information indicating whether the object is in proximity, measured by the proximity sensor 410, the iris image recognized by the iris sensor, and so forth to the first processor 120.

The sensor module 180 measures physical quantity or senses an operation state of the electronic device 401 as described above with reference to FIG. 1. Referring to FIG. 4, the sensor module 180 may include the proximity sensor 410 or the iris sensor 420. The proximity sensor 410 may be used to determine whether an object is in proximity to the electronic device 101, and the iris sensor 420 may recognize an iris of a user who uses the electronic device 401.

The proximity sensor 410 may include a light-emitting unit and a light-receiving unit, in which the light-emitting unit may include an IR LED and the light-receiving unit may include a photo diode. The iris sensor 420 may include a light-emitting unit and a light-receiving unit, in which the light-emitting unit may include an IR LED and the light-receiving unit may include an IR camera.

The camera module 430 captures a still image or moving images as described with reference to FIG. 2. According to an embodiment, the camera module 430 may photograph the user using the electronic device 401, and generate a captured image. The first processor 120 determines a skin color of the user based on the captured image generated by the camera module 430. Once determining the skin color, the first processor 120 determines a first reference value used for the proximity sensor 410 to determine whether an object is in proximity, based on the determined skin color.

While the processor has been described above as being separated into the first processor 120 and the second processor 185, the first processor 120 and the second processor 185 may be implemented with one processor. Moreover, the sensor module 180 and the camera module 430 have been described as being connected with the second processor 185, but various modified embodiments may be possible. For example, some of sensors included in the sensor module 180 (for example, the iris sensor 420) and the camera module 430 may be connected with the first processor 120, and other sensors included in the sensor module 180 (for example, the proximity sensor 410) may be connected with the second processor 185.

According to another embodiment, the second processor 185 may be implemented in a form including the first processor 120, such that all operations of the second processor 185 may be executed by the first processor 120. In other words, the proximity sensor 410, the iris sensor 420, or the camera module 430 may be connected with the first processor 120 and may be controlled by the first processor 120.

Figure 5:
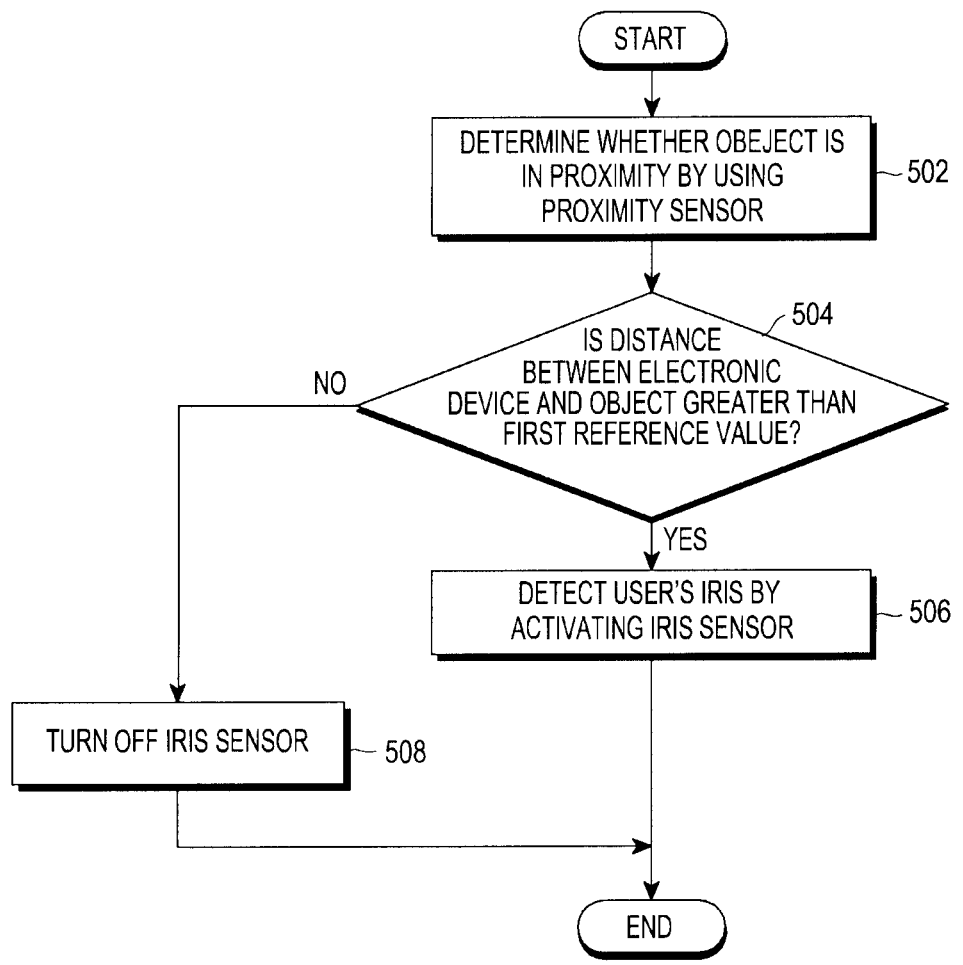
FIG. 5 is a flowchart illustrating an operation method of an electronic device according to various embodiments.

FIG. 5 is a flowchart illustrating an operation method of an electronic device according to various embodiments.

Referring to FIG. 5, in operation 502, the electronic device 101 determines whether an object is in proximity, by using the proximity sensor 410. According to an embodiment, in operation 502, the proximity sensor 410 generates proximity information indicating whether the object is in proximity. The proximity sensor 410 generates proximity information every preset time (e.g., 10 ms) and delivers the proximity information that is generated every preset time to the first processor 120 or the second processor 185. The first processor 120 or the second processor 185 may determine whether the object is in proximity to the electronic device 101 by using the proximity information generated by the proximity sensor 410 in operation 502.

In operation 504, the electronic device 101 determines whether the distance between the electronic device 101 and the object is greater than the first reference value (e.g., 20 cm) based on the proximity information generated by the proximity sensor 410. According to an embodiment, the electronic device 101 activates the iris sensor 420 when the distance between the electronic device 101 and the object is greater than the first reference value. According to an embodiment, the first reference value may be in a range (e.g., 20-25 cm) of the distance between the electronic device 101 and the object.

When the distance between the electronic device 101 and the object is greater than the first reference value (operation 504: YES), the electronic device 101 activates the iris sensor 420 to detect a user's iris in operation 506. According to an embodiment, in operation 506, light (e.g., IR light) for detecting the user's iris may be output from the light-emitting unit (e.g., the IR LED) of the iris sensor. The light output from the light-emitting unit is reflected from the object or the user and is input to the light-receiving unit (e.g., the IR camera) of the iris sensor 420, in which the light-receiving unit then receives the light reflected from the object or the user and generates a scan image. The iris sensor 420 performs iris detection of operation 506 by detecting an image corresponding to the user's iris, that is, an iris image from the scan image.

According to an embodiment, after operation 506, until the user is authenticated using the detected iris, the electronic device 101 repeats operation 502 to determine whether a particular object or the user approaches.

When the distance between the electronic device 101 and the object is not greater than the first reference value (operation 504: NO), the electronic device 101 deactivates (e.g., turns off) the iris sensor 420 in operation 508. According to an embodiment, in operation 508, the distance between the electronic device 101 and the object may fall in a range less than or equal to the first reference value (e.g., 0-20 cm). A distance less than or equal to the first reference value may be a distance that is not appropriate for the iris sensor 420 to operate to detect the user's iris, for example, a distance in which light output from the light-emitting unit of the iris sensor 420 may damage a user's eye. Thus, the electronic device 101 may protect the user's eye by deactivating (e.g., turning off) the iris sensor 420. According to another embodiment, in operation 508, the first processor 120 or the second processor 185 may maintain the iris sensor 420 in a stand-by state (or an idle state) where the light-emitting unit of the iris sensor 420 does not operate.

According to an embodiment, after operation 508, the electronic device 101 returns to operation 502 to generate proximity information about an object approaching the electronic device 101, by using the proximity sensor 410. According to an embodiment, the first processor 120 or the second processor 185 of the electronic device 101 may control the proximity sensor 410 to generate the proximity information continuously until the distance between the electronic device 101 and the object is greater than the first reference value.

According to an embodiment, in operation 504, the electronic device 101 may determine whether the proximity information generated in operation 502 is valid, before determining whether the distance between the electronic device 101 and the object is greater than the first reference value. If the proximity information is valid, the electronic device 101 performs operation 506; unless the proximity information is valid, the electronic device 101 performs operation 508.

Figure 6:
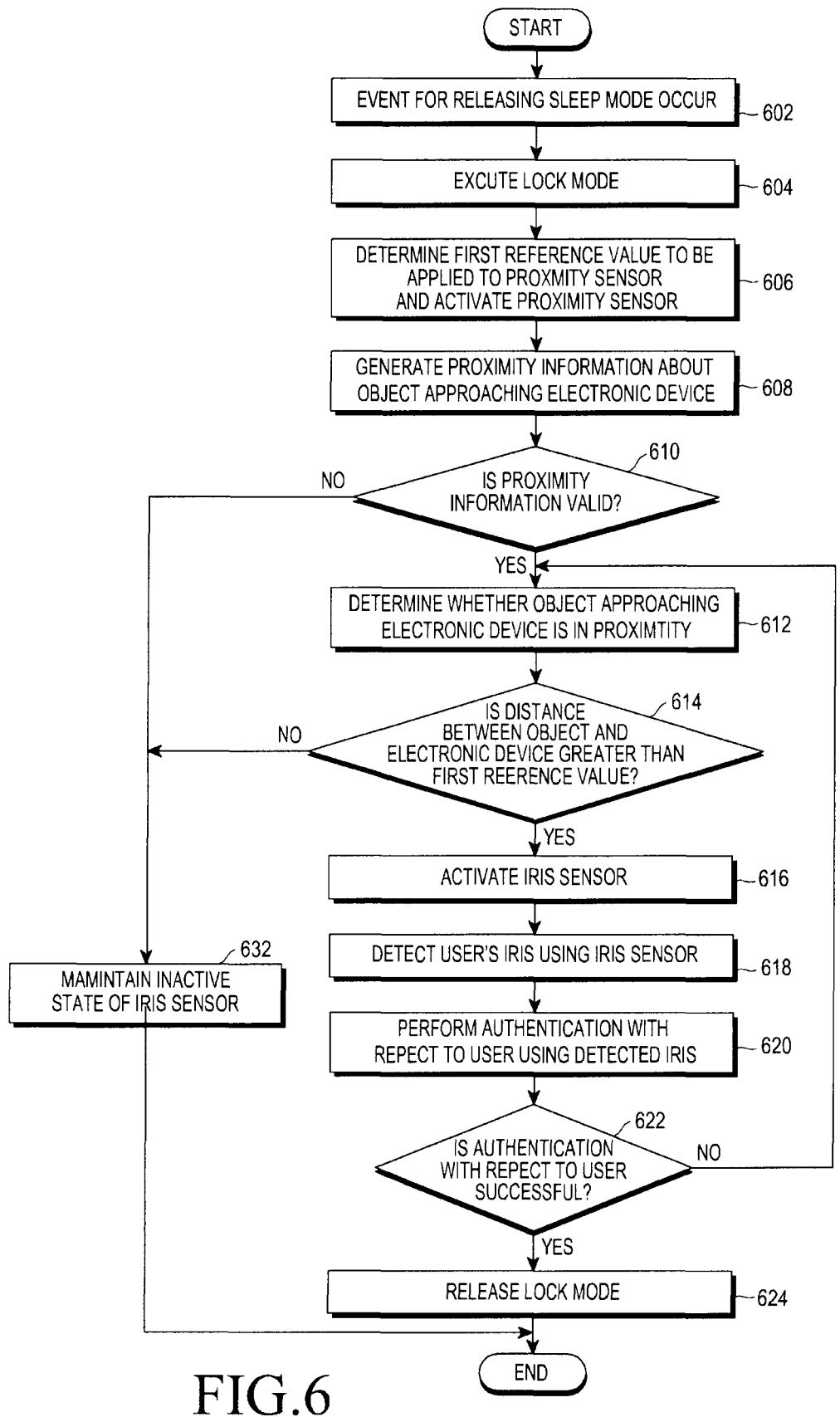
FIG. 6 is a flowchart illustrating an operation method of an electronic device according to various embodiments.

FIG. 6 is a flowchart illustrating an operation method of an electronic device according to various embodiments.

Referring to FIG. 6, when an event for releasing a sleep mode of the electronic device 101 occurs in operation 602, the electronic device 101 executes a lock mode in operation 604. According to an embodiment, the lock mode indicates a state where a lock screen is displayed on the display 160, and may be an operation mode in which a function executable on the electronic device 101 is limited when authentication with respect to the user of the electronic device 101 is not successful. The event for releasing the sleep mode may be, for example, a case where a user input for releasing the sleep mode is received, a case where a call or a message is received, or the like.

In operation 606, the electronic device 101 determines the first reference value to be applied to the proximity sensor 410 and activates the proximity sensor 410. The first reference value determined in operation 606 may be a reference value for determining whether the distance between the electronic device 101 and the object is appropriate for activating the iris sensor 420. The first reference value may be determined by the first processor 120 or the second processor 185, and when the first reference value is determined by the first processor 120, the first reference value may be delivered to the second processor 185 from the first processor 120 through the bus 110.

In operation 608, the electronic device 101 generates proximity information about an object approaching the electronic device 101, by using the proximity sensor 410. In operation 610, the first processor 101 or the second processor 185 of the electronic device 101 determines whether the proximity information generated by the proximity sensor 410 is valid. For example, the first processor 120 or the second processor 185 may determine that the proximity information is not valid, when the proximity information generated every first time (e.g., 10 ms) is the same during second time (e.g., 100 ms). The first processor 120 or the second processor 185 may also determine that the proximity information is not valid or that the proximity sensor 410 is in an abnormal state, when any proximity information is not delivered from the proximity sensor 410 during the second time (e.g., 100 ms).

When determining that the proximity information is not valid (operation 610: NO), the first processor 120 or the second processor 185 goes to operation 632 to maintain an inactive state of the iris sensor 420. In operation 632, the first processor 120 or the second processor 185 maintains a turn-off state of the iris sensor 420 or the light-emitting unit thereof, or turns off the iris sensor 420 or the light-emitting unit thereof in a turn-on state.

When determining that the proximity information is valid (operation 610: YES), the first processor 120 or the second processor 185 determines whether an object approaching the electronic device 101 is in proximity in operation 612. The proximity sensor 410 generates proximity information about the object approaching the electronic device 101 also in operation 612, like in operation 608, and the first processor 120 or the second processor 185 determines whether a distance between the object approaching the electronic device 101 and the electronic device 101 is greater than a first reference value, based on the proximity information in operation 614.

According to an embodiment, when the electronic device 101 is not in the sleep mode, the proximity sensor 410 generates proximity information every preset time (e.g., 10 ms) and delivers the proximity information that is generated every preset time to the first processor 120 or the second processor 185. The first processor 120 or the second processor 185 may determine whether the object is in proximity to the electronic device 101 by using the proximity information generated by the proximity sensor 410 in operation 612.

When the distance between the electronic device 101 and the object is greater than the first reference value (operation 614: YES), the electronic device 101 activates the iris sensor 420 in operation 616. According to an embodiment, the electronic device 101 may control the light-emitting unit of the iris sensor 420 to output light by turning on the iris sensor 420 or the light-emitting unit thereof in operation 616.

Once the iris sensor 420 is activated in operation 616, the electronic device 101 detects the user's iris by using the iris sensor 420 in operation 618. In operation 620, the electronic device 101 performs authentication with respect to the user by using the iris detected by the iris sensor 420. According to an embodiment, in operation 620, the first processor 120 may determine similarity between the iris detected by the iris sensor 420, for example, an iris image captured by the IR camera included in the iris sensor 420 and an iris image that is previously stored in the memory 130 of the electronic device 101, and may determine whether the similarity is greater than or equal to a preset rate (e.g., 90%).

In operation 622, the electronic device 101 determines whether authentication with respect to the user is successful. According to an embodiment, in operation 622, the first processor 120 of the electronic device 101 determines that authentication with respect to the user is successful when the similarity between the iris detected by the iris sensor 420 in operation 618 and the iris image previously stored in the memory 130 is greater than or equal to a preset rate (e.g., 90%), and determines that the authentication with respect to the user fails when the similarity is less than the preset rate.

When determining that the authentication with respect to the user is successful (operation 622: YES), the electronic device 101 releases the lock mode thereof in operation 624. When determining that the authentication with respect to the user fails (operation 622: NO), the electronic device 101 maintains the current state thereof without performing any operation. According to another embodiment, when determining that the authentication with respect to the user fails (operation 622: NO), the electronic device 101 determines whether the distance between the object and the electronic device 101 is greater than the first reference value based on the proximity information generated by the proximity sensor 410 until the distance between the object and the electronic device 101 is greater than the first reference value.

When the distance between the electronic device 101 and the object is less than or equal to the first reference value (operation 614: NO), the electronic device 101 maintains the inactive state of the iris sensor 420 in operation 632. A distance less than or equal to the first reference value may be a distance that is not appropriate for the iris sensor 420 to operate to detect the user's iris, for example, a distance in which light output from the light-emitting unit of the iris sensor 420 may damage the user's eye. Thus, the electronic device 101 may protect the user's eye by maintaining the inactive state of the iris sensor 420 or deactivating (e.g., turning off) the iris sensor 420 in operation 632.

According to another embodiment, the electronic device 101 may repeat operation 612 of determining whether the object approaching the electronic device 101 is in proximity and operation 614 of determining whether the distance between the object and the electronic device 101 is greater than the first reference value, while maintaining the inactive state of the iris sensor 420 in operation 632.

Figure 7A:
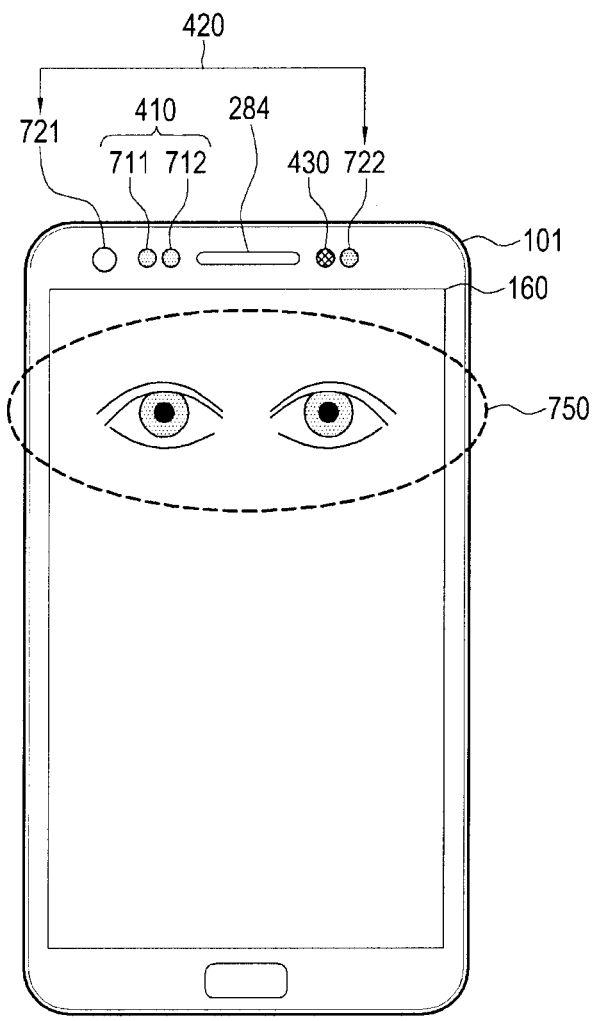
FIGS. 7A and 7B illustrate an example of an electronic device according to various embodiments.
Figure 7B:
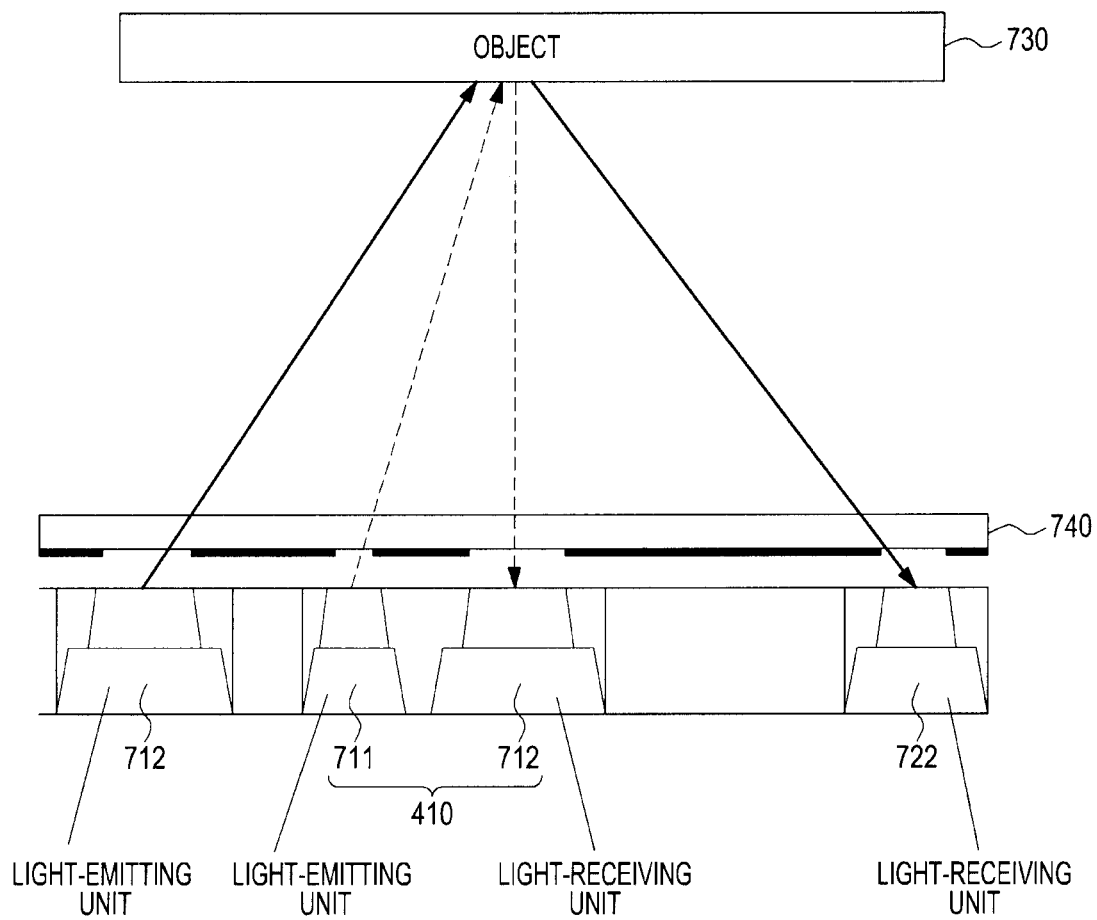

FIGS. 7A and 7B illustrate an example of an electronic device according to various embodiments.

As illustrated in FIG. 7A, on an upper end portion of the electronic device 101 may be arranged a light-emitting unit 721 of the iris sensor 420, a light-emitting unit 711 of the proximity sensor 410, a light-receiving unit 712 of the proximity sensor 410, the receiver 284, the camera module 430, and a light-receiving unit 722 of the iris sensor 420.

The light-emitting unit 711 of the proximity sensor 410 may include an IR LED capable of outputting light, for example, infrared light, for determining whether an object 730 is in proximity under control of the first processor 120 or the second processor 185. The amount of the light output from the light-emitting unit 711 may be too small to damage a human body.

The light-receiving unit 712 of the proximity sensor 410 may include a photo diode for receiving the light reflected from the object 730 after being output from the light-emitting unit 711. The proximity sensor 410 may indicate the amount of the light input to the light-receiving unit 712 in the form of a level value. The level value indicating the amount of the light measured by the light-receiving unit 712 may be delivered to the first processor 120 or the second processor 185. The first processor 120 or the second processor 185 controls on or off of the proximity sensor 410 or the iris sensor 420 by using the level value.

The light-emitting unit 721 of the iris sensor 420 may include an IR LED that outputs light, for example, infrared light, for scanning the user's iris. The infrared light output from the light-emitting unit 721 is intended to scan the user's iris, and thus may have a high irradiance, such that when a distance between the user and the light-emitting unit 721 is less than the first reference value, the output infrared light may damage the user's eye. As a result, the first processor 120 or the second processor 185 may control output of the light from the light-emitting unit 721 based on the distance between the electronic device 101 and the object 730.

The light-receiving unit 722 of the proximity sensor 420 may include an IR camera for receiving the light (e.g., infrared light) reflected from the object 730 after being output from the light-emitting unit 721. The IR camera receives the light reflected from the object 730 and generates an image (e.g., a scan image). The scan image generated by the IR camera may include the user's iris. When the iris sensor 420 senses the user's iris, it means that the iris sensor 420 scans the user's iris by using the IR camera and the scan image including the user's iris is generated by the IR camera. As stated above, when the scan image including the user's iris is generated by the iris sensor 420, the first processor 120 or the second processor 185 extracts an iris image corresponding to the user's iris from the scan image. The first processor 120 or the second processor 185 performs authentication with respect to the user by using the iris sensor 420 by comparing the extracted iris image with the iris image previously stored in the memory 130.

Referring to FIG. 7A, the camera module 430 of the electronic device 101 photographs the user whose iris is being scanned by the iris sensor 420, and the display 160 displays an image 750 (e.g., a preview image) captured by the camera module 430 (in real time).

Referring to FIG. 7B, the proximity sensor 410 of the electronic device 101 may be installed under a transparent housing 740 (e.g., cover glass). As illustrated in FIG. 7A, the light-emitting unit 711 and the light-receiving unit 712 of the proximity sensor 410 may be arranged in adjacent to each other, and the light-emitting unit 721 and the light-receiving unit 722 of the iris sensor 420 may be arranged spaced apart from each other by a preset distance or more (e.g., 2 cm).

Referring to FIG. 7B, the light (e.g., infrared light) output through the light-emitting unit 711 of the proximity sensor 410 is reflected from the object 730, and the reflected light is input to the light-receiving unit 712 of the proximity sensor 410. The light (e.g., infrared light) output through the light-emitting unit 721 of the iris sensor 420 is reflected from the object 730, and the reflected light is input to the light-receiving unit 722 of the iris sensor 420.

Figure 8:
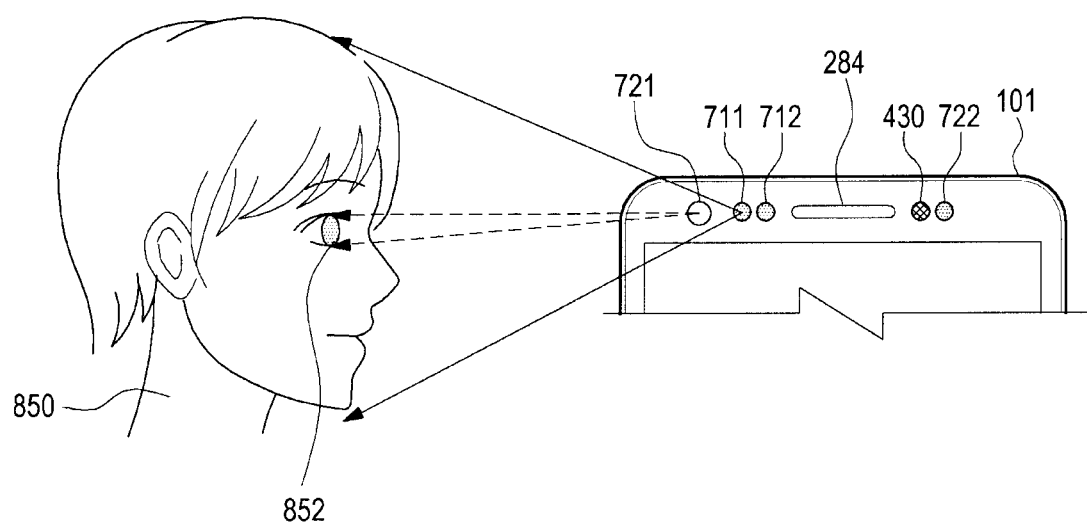
FIG. 8 illustrates an example where a user's iris is detected by an electronic device according to various embodiments.

FIG. 8 illustrates an example where a user's iris is detected by an electronic device according to various embodiments. FIG. 8 shows light output from the light-emitting unit 711 of the proximity sensor 410 and light output from the light-emitting unit 721 of the iris sensor 420.

Referring to FIG. 8, the light-emitting unit 721 of the iris sensor 420 outputs light, for example, infrared light, for photographing an iris 852 of a user 850. The light output from the light-emitting unit 721 is reflected from the user 850, for example, the iris 850 of the user 850 and is input to the IR camera included in the light-receiving unit 722 of the iris sensor 420.

The iris sensor 410 may be implemented in a form where the light-emitting unit 721 and the light-receiving unit 722 are spaced apart from each other by a preset distance (e.g., 2 cm) or more to accurately recognize a shape of the iris. According to an embodiment, the IR camera of the light-receiving unit 722 may obtain an image of 200 pixels or more depending on the light reflected from the user 850. The iris sensor 420 performs noise cancellation, edge extraction, contrast enhancement, and so forth through pre-processing, identifies eye, iris, and pupil regions, and converts an iris pattern into a unique code value (e.g., a binary value) from an image of the iris region through recognition. As authentication with respect to the user 850, the first processor 120 or the second processor 185 compares the code value into which the iris pattern is converted by the iris sensor 420 with a previously stored reference code value. When the code value into which the pattern of the iris 852 is converted by the iris sensor 420 is similar to the previously stored reference code value at a preset rate or more, the first processor 120 determines that authentication with respect to the user 850 is successful.

Figure 9A:
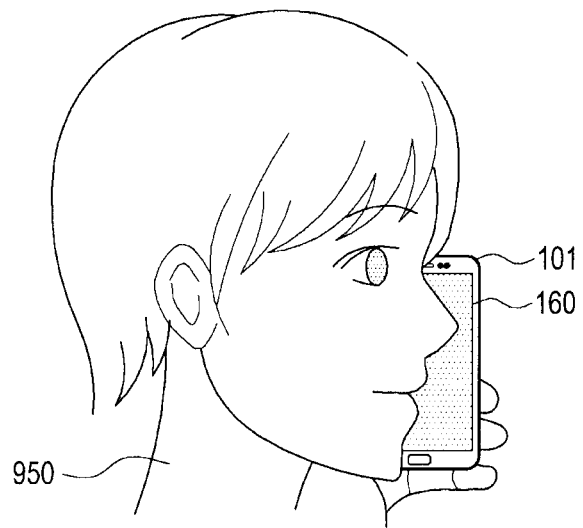
FIGS. 9A and 9B illustrate an operation of an electronic device according to various embodiments.
Figure 9B:
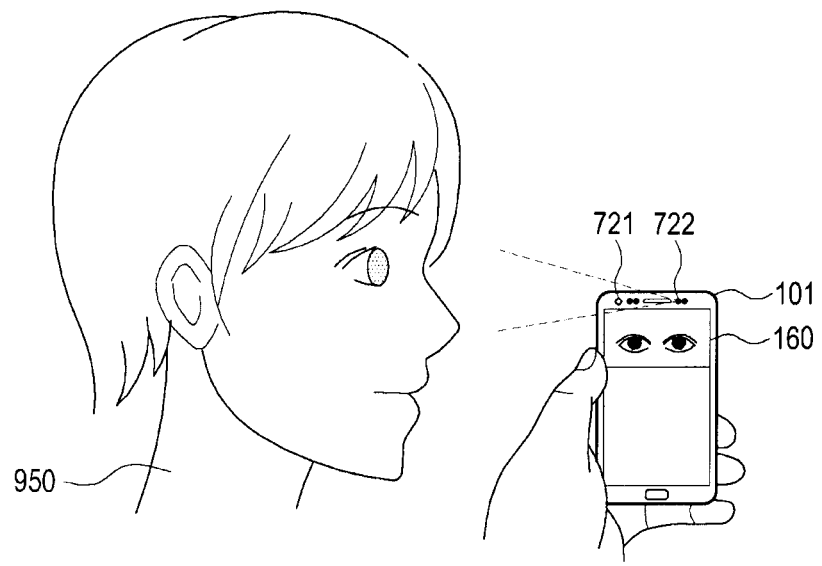

FIGS. 9A and 9B illustrate an operation of an electronic device according to various embodiments. In FIGS. 9A and 9B, a threshold value (e.g., the first reference value) used for the proximity sensor 410 to determine whether an object is in proximity may differ.

Referring to FIG. 9A, a distance between the user 950 and the electronic device 101 may be less than the second reference value (e.g., 3 cm) that is less than the first reference value (e.g., 20 cm). According to an embodiment, the first processor 120 or the second processor 185 may use the second reference value as a criterion for determining whether the object is in proximity. For example, when an event occurring in the electronic device 101 is not the event for activating the iris sensor 420, the first processor 120 may control the second processor 185 to use the second reference value as the criterion for determining whether the object is in proximity.

When the second reference value is used to determine whether the object is in proximity, the electronic device 101 turns off the display 160 when the distance between the user 950 and the electronic device 101 is less than the second reference value as shown in FIG. 9A. For example, when a call is received in the electronic device 101 or the user desires to send a call, the first processor 120 determines that the user is on the phone and is not viewing the display 160 of the electronic device 101 when the distance between the electronic device 101 and the user 950 (or the object) is less than the second reference value. In this case, the first processor 120 controls the electronic device 101 to turn off the display 160. For example, when the electronic device 101 is not receiving/sending a call, but the distance between the electronic device 101 and the object is less than the second reference value, the first processor 120 may determine that the electronic device 101 is covered by a case or placed in a bag, and may turn off the display 160.

Referring to FIG. 9B, the distance between the user 950 and the electronic device 101 may be greater than the first reference value (e.g., 20 cm). According to an embodiment, the first processor 120 or the second processor 185 may use the first reference value as a criterion for determining whether the object is in proximity, upon occurrence of the event for activating the iris sensor 420. When the first reference value is used to determine whether the object is in proximity, the electronic device 101 activates the iris sensor 420 when the distance between the user 950 and the electronic device 101 is greater than the first reference value as shown in FIG. 9B. The light output from the light-emitting unit 721, for example, the IR LED, of the iris sensor 420 may be reflected from the user 950, and is input to the light-receiving unit 722, for example, the IR camera, of the iris sensor 420. In this way, the iris of the user 950 is scanned and the display 160 of the electronic device 101 displays a process of scanning the iris (in real time) and displays the iris image generated by the IR camera as a preview image.

Figure 10:
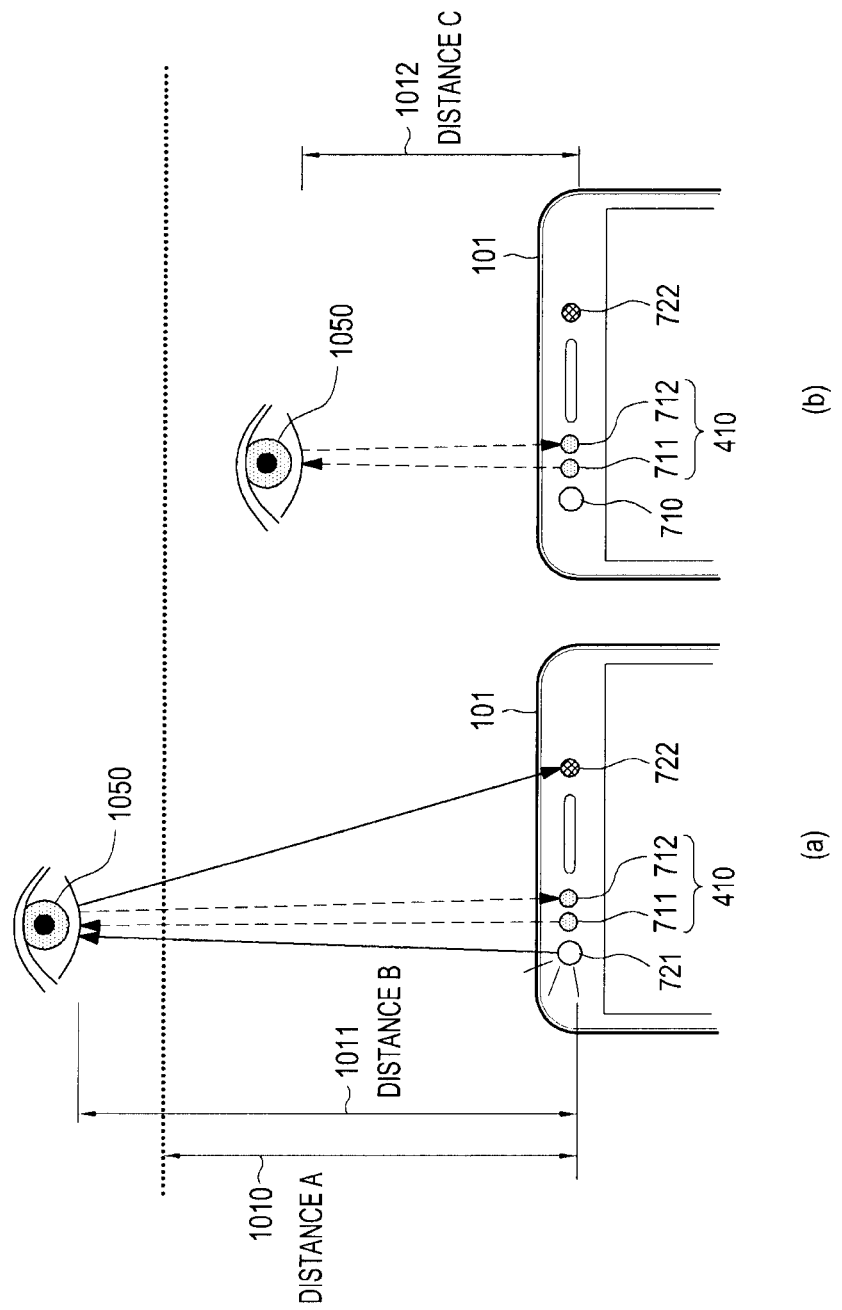
FIG. 10 illustrates an operation of an electronic device according to various embodiments.

FIG. 10 illustrates an operation of an electronic device according to various embodiments.

According to various embodiments of the present disclosure, referring to FIGS. 10A and 10B, the electronic device 101 determines whether a distance between an iris 1050 of the user and the electronic device 101 is a distance in which the iris sensor 420 may be activated, by using the proximity sensor 410. In FIGS. 10A and 10B, activation of the iris sensor 420 may mean that the light (e.g., infrared light) for scanning the iris 1050 of the user is output from the light-emitting unit 721 of the iris sensor 420. Deactivation of the iris sensor 420 may mean a state where the light (e.g., infrared light) for scanning the iris 1050 of the user is not output from the light-emitting unit 721 of the iris sensor 420, for example, a state where the iris sensor 420 is turned off or a state where the iris sensor 420 is turned on, but the light-emitting unit 721 is turned off.

In FIGS. 10A and 10B, it is assumed that the iris sensor 1050 is activated when the distance between the electronic device 101 and the iris 1050 is greater than or equal to "a distance A 1010". According to an embodiment, the distance A 1010 may be the first reference value for determining whether to activate the iris sensor 420. The distance A 1010 may be previously stored in the memory 130, may be received from the server 106, or may be designated by the user.

Referring to FIGS. 10A and 10B, once light (e.g., infrared light) is output from the light-emitting unit 711 of the proximity sensor 410, the light-receiving unit 712 receives light reflected from the user's iris 1050 in the light output from the light-emitting unit 711. The electronic device 101 determines based on the amount of light input through the light-receiving unit 712 whether the distance between the electronic device 101 and the user's iris 1050 is greater than or equal to the distance A 1010.

FIG. 10A shows a case where the distance between the electronic device 101 and the user's iris 1050 is greater than the distance A 1010, and in FIG. 10A, the distance between the electronic device 101 and the user's iris 1050 may be "a distance B 1011" that is greater than the distance A 1010. When the distance between the electronic device 101 and the user's iris 1050 is greater than the distance A 1010, the electronic device 101 activates the iris sensor 420. Once the iris sensor 420 is activated, light (e.g., infrared light) for scanning the user's iris 1050 may be output from the light-emitting unit 721, for example, the IR LED, included in the iris sensor 420, as shown in FIG. 10A. The light reflected from the user's iris 1050 may be input to the light-receiving unit 722, for example, the IR camera, of the iris sensor 420.

FIG. 10B shows a case where the distance between the electronic device 101 and the user's iris 1050 is less than the distance A 1010, and in FIG. 10B, the distance between the electronic device 101 and the user's iris 1050 may be "a distance C 1012" that is less than the distance A 1010. When the distance between the electronic device 101 and the user's iris 1050 is less than the distance A 1010, the electronic device 101 deactivates the iris sensor 420.

Once the iris sensor 420 is deactivated, the iris sensor 420 may not output the light, for example, infrared light, for scanning the user's iris 1050. According to an embodiment, once the iris sensor 420 is deactivated as shown in FIG. 10B, the first processor 120 of the electronic device 101 may display guide data for activating the iris sensor 420 through the display 160. For example, the first processor 120 may display a message 'take a terminal further away' through the display 160 or may output the message as a voice message.

Figure 11A:
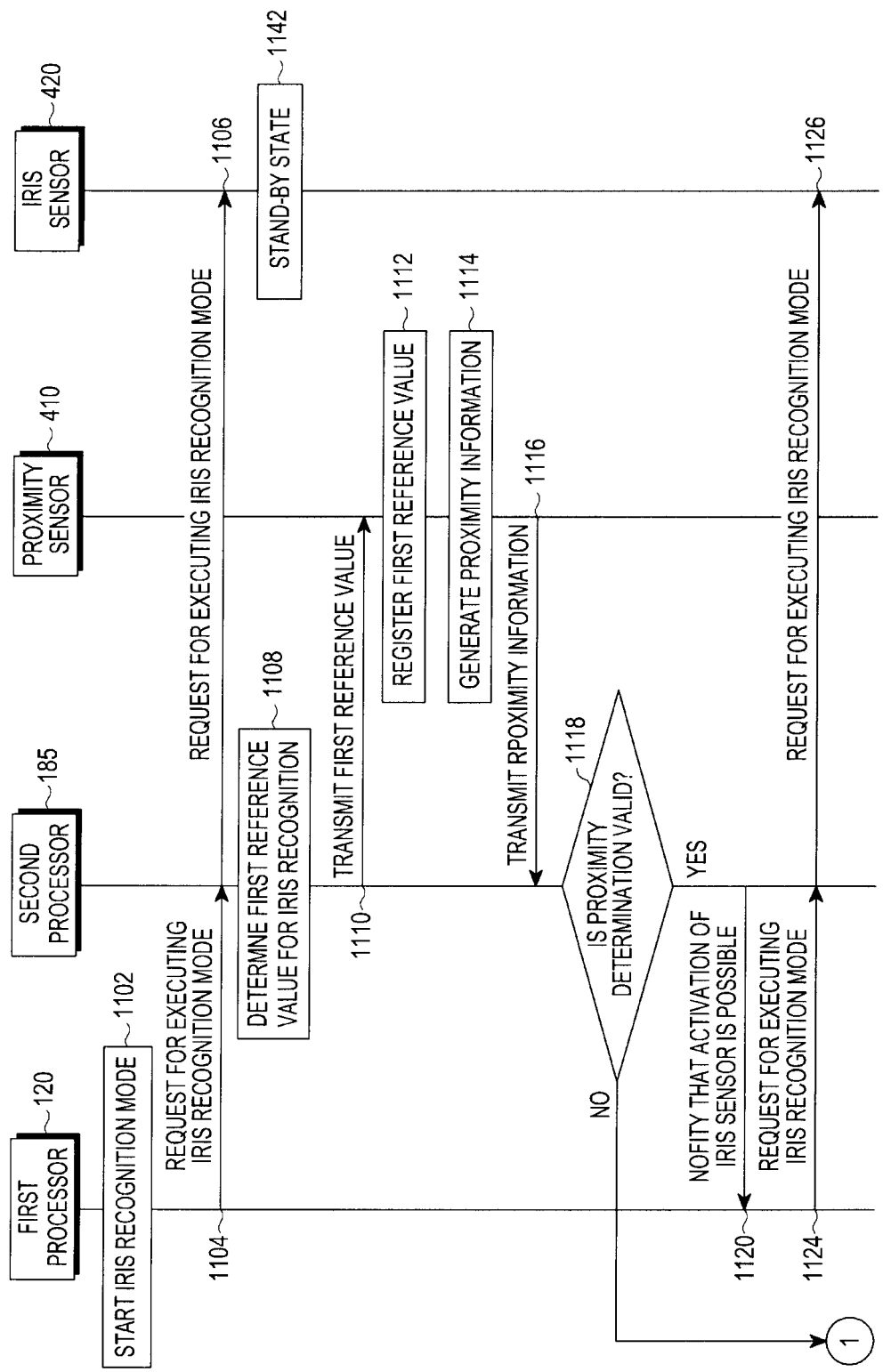
FIGS. 11A and 11B are flowcharts of an operation method of an electronic device according to various embodiments.
Figure 11B:
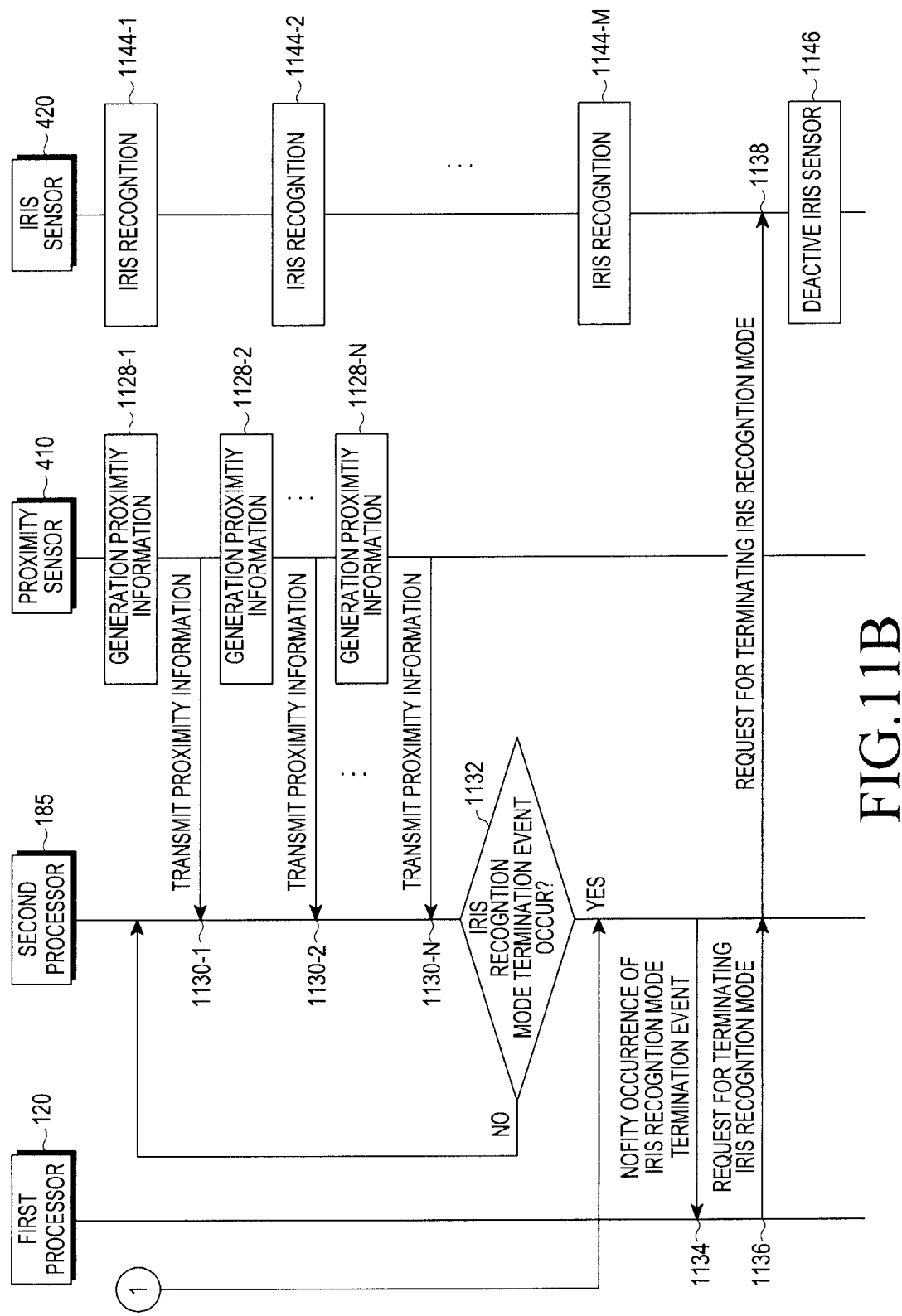

FIGS. 11A and 11B are flowcharts of an operation method of an electronic device according to various embodiments.

Referring to FIG. 11A, the first processor 120 starts an iris recognition mode in operation 1102. According to an embodiment, the first processor 120 determines to execute the iris recognition mode when the electronic device 101 is released from the sleep mode, the lock mode is executed, or user authentication is needed.

In operation 1104, the first processor 120 sends a request for executing the iris recognition mode to the second processor 185. In operation 1106, the second processor 185 requests execution of the iris recognition mode. According to an embodiment, the second processor 185 may request execution of the iris recognition mode by sending a request for maintaining the stand-by state (or an idle state) to the iris sensor 420.

In operation 1142, the iris sensor 420 maintains the stand-by state. The stand-by state may mean a state where light is not output from the light-emitting unit 721 of the iris sensor 420. According to an embodiment, in the stand-by state of operation 1142, the light-emitting unit 721 (e.g., the IR LED) of the iris sensor 420 may be in an on state and at the same time, in a non-operation state, and the light-receiving unit (e.g., the IR camera) may be in an off state. According to another embodiment, in the stand-by state of operation 1142, both the light-emitting unit 721 (e.g., the IR LED) and the light-receiving unit (e.g., the IR camera) of the iris sensor 420 are in the off state, but the power of the iris sensor 420 may be in an on state. According to another embodiment, in the stand-by state of operation 1142, the light-emitting unit 721 (e.g., the IR LED) of the iris sensor 420 may output light of a minimum value (an initialization mode) and the light-receiving unit (e.g., the IR camera) may be in an operation state.

According to an embodiment, in operation 1104, the second processor 185 sets a time in which the iris sensor 420 is to maintain the stand-by state (hereinafter, a stand-by time) (for example, 100 ms). During the stand-by time, the electronic device 101 executes at least one of operations 1106 through 1126. According to an embodiment, when a request for activating the iris sensor 420 is not received during the stand-by time, the iris sensor 420 is deactivated, such that both the light-emitting unit 721 and the light-receiving unit 722 are turned off and iris recognition may not be executed. When the request for activating the iris sensor 420 is received within the stand-by time, the iris sensor 420 is activated such that both the light-emitting unit (e.g., the IR LED) and the light-receiving unit (e.g., the IR camera) operate. According to an embodiment, when the iris sensor 420 receives the activation request within the stand-by time and the light of the minimum value is output from the light-emitting unit (e.g., the IR LED), the iris sensor 420 may increase a signal strength of light output from the light-emitting unit and operate the light-receiving unit (e.g., the IR camera).

In operation 1108, the second processor 185 determines a first reference value used for the proximity sensor 410 to determine whether an object approaches the electronic device 101, during execution of the iris recognition mode by the electronic device 101. In operation 1110, the second processor 185 transmits the first reference value to the proximity sensor 410. The proximity sensor 410 registers the first reference value therein in operation 1112, and generates proximity information in operation 1114. The proximity information generated in operation 1114 may be a level value indicating the amount of light input to the light-receiving unit 712 of the proximity sensor 410.

In operation 1116, the proximity sensor 410 transmits the proximity information generated in operation 1114 to the second processor 185. According to an embodiment, the proximity sensor 410 may transmit information indicating a current state of the proximity sensor 410 (e.g., on/off and error occurrence of the proximity sensor 410, etc.), for example, state information, together with the proximity information, to the second processor 185 in operation 1116.

In operation 1118, the second processor 185 determines whether proximity determination by the proximity sensor 410 is valid. According to an embodiment, the second processor 185 may determine whether the proximity determination by the proximity sensor 410 is valid by determining whether the proximity sensor 410 is operable normally based on the proximity information received from the proximity sensor 410 or the state information indicating the current state of the proximity sensor 410.

According to another embodiment, in operation 1118, the second processor 185 may determine whether the proximity sensor 410 is operable normally by determining whether the proximity information is valid. The second processor 185 may determine that the proximity sensor 410 does not operate normally, when determining that the proximity information generated by the proximity sensor 410 is not valid (operation 1118: NO).

For example, when the level value indicating the amount of the light received in the light-receiving unit 712 of the proximity sensor 410 falls beyond a preset range, the second processor 185 may determine that the proximity information is not valid. For example, when the proximity sensor 410 operates normally, the level value indicating the amount of light ranges between 50 and 100 on average. When the level value ranges between 1 and 30 or is greater than or equal to 200, the second processor 185 determines that the proximity information is not valid and that the proximity sensor 410 is in an abnormal state. On the other hand, when the level value is equal to 75, the second processor 185 may determine that the proximity information is valid and that the proximity sensor 410 is a normal operation state.

Referring to FIGS. 11A and 11B, when the proximity determination by the proximity sensor 410 is not valid as a result of determination in operation 1118 (1118: NO), the second processor 185 goes to operation 1134 to notify the first processor 120 of occurrence of an event for terminating the iris recognition mode (hereinafter, an iris recognition mode termination event). When the proximity sensor 410 is not operable normally, the proximity sensor 410 may not be able to determine whether the object is in proximity, such that for safety of the user's eye, the first processor 120 controls the electronic device 101 not to perform iris recognition using the iris sensor 420. In other words, when the proximity sensor 410 is not operable normally, this case may be included in the iris recognition mode termination event.

The first processor 120 having received the iris recognition mode termination event notification in operation 1134 transmits a request for terminating the iris recognition mode to the second processor 185 in operation 1136. The second processor 185 transmits the request for terminating the iris recognition mode to the iris sensor 420 in operation 1138. In operation 1146, the iris sensor 420 is deactivated. Deactivation of the iris sensor 420 in operation 1146 may mean that the iris sensor 420 maintains the stand-by state or the iris sensor 420 is turned off.

When the proximity determination by the proximity sensor 410 is valid as a result of determination in operation 1118 (1118: YES), the second processor 185 notifies the first processor 120 that activation of the iris sensor 420 is possible, in operation 1120. In operation 1124, the first processor 120 transmits the request for activating the iris sensor 420 to the second processor 185. In operation 1126, the second processor 185 transmits the activation request to the iris sensor 420.

The iris sensor 420 having received the activation request from the second processor 185 performs infrared scanning with respect to the iris of the user of the electronic device 101 by using the IR LED of the light-emitting unit 721 and the IR camera of the light-receiving unit 722, and detects the user's iris from the scan image, thereby performing iris recognition. The iris sensor 420 may perform iris recognition by performing operations 1144-1, 1144-2, . . . , operation 1144-M every preset time (e.g., 30 ms).

Referring to FIGS. 11A and 11B, when the proximity determination by the proximity sensor 410 is valid as a result of determination in operation 1118 (1118: YES), the proximity sensor 410 generates proximity information by performing operation 1128-1, operation 1128-2, . . . , operation 1128-N every preset time (e.g., 10 ms), and transmits the proximity information generated in each of operations 1128-1 through 1128-N to the second processor 185 by performing operations 1130-1, operation 1130-2, . . . , operation 1130-N respectively, after operations 1128-1 through 1128-N.

Referring to FIGS. 11A and 11B, in operations 1128-1 through 1128-N, the proximity sensor 410 generates the proximity information as information indicating whether a distance between an object approaching the electronic device 101 or the user and the electronic device 101 is greater than the first reference value, by using the first reference value determined in operation 1108. According to an embodiment, the proximity information generated in operations 1128-1 through 1128-N may not be a level value indicating the amount of light received through the light-receiving unit 712 of the proximity sensor 410, unlike the proximity information generated in operation 1114. For example, the proximity sensor 410 may transmit 1 as proximity information to the second processor 185 when the distance between the object approaching the electronic device 101 or the user and the electronic device 101 is greater than the first reference value, and may transmit 0 as proximity information to the second processor 185 when the distance is less than or equal to the first reference value.

In operation 1132, the second processor 185 determines whether an iris recognition mode termination event occurs based on the proximity information received from the proximity sensor 410. According to an embodiment, the second processor 185 receives proximity information from the proximity sensor 410, N times during preset reference time (e.g., 300 ms) and determines whether the iris recognition mode termination event occurs based on the received proximity information. In this case, the iris recognition mode termination event may include a case where the distance between the electronic device 101 and the object is less than or equal to the first reference value. For example, the iris recognition mode termination event may include a case where the latest proximity information indicates that the distance between the electronic device 101 and the object is less than or equal to the first reference value or a case where the distance between the electronic device 101 and the object is less than or equal to the first reference value N/2 times during the reference time (e.g., 300 ms).

When the iris recognition mode termination event does not occur as a result of determination of operation 1132 (1132: NO), the proximity sensor 410 performs operations 1128-1 through 1128-N of generating proximity information and operations 1130-1 through 1130-N of transmitting the proximity information. The iris sensor 420 may also perform operations 1144-1 through operation 1144-M of recognizing an iris.

When the iris recognition mode termination event occurs as the result of determination of operation 1132 (1132: YES), the second processor 185 notifies the first processor 120 of occurrence of the iris recognition mode termination event in operation 1134. In operation 1136, the first processor 120 transmits the request for terminating the iris recognition mode to the second processor 185. The second processor 185 transmits the request for terminating the iris recognition mode to the iris sensor 420 in operation 1138. In operation 1146, the iris sensor 420 is deactivated. Deactivation of the iris sensor 420 in operation 1146 may mean that the iris sensor 420 maintains the stand-by state or the iris sensor 420 is turned off.

According to an embodiment, when the iris sensor 420 is deactivated in operation 1146, the iris sensor 420 maintains the stand-by state. In this case, the power of the iris sensor 420 is in the on state, but the light-emitting unit (e.g., the IR LED) is in an off state and the light-receiving unit (e.g., the IR camera) is in a non-operation state. In the stand-by state, the power of the iris sensor 420 is in the on state, but both the light-emitting unit (e.g., the IR LED) and the light-receiving unit (e.g., the IR camera) are in the off state. In the stand-by state, the power of the iris sensor 420 is in the on state, but the light-emitting unit (e.g., the IR LED) outputs light of a minimum value and the light-receiving unit (e.g., the IR camera) is in the operation state.

Figure 12:
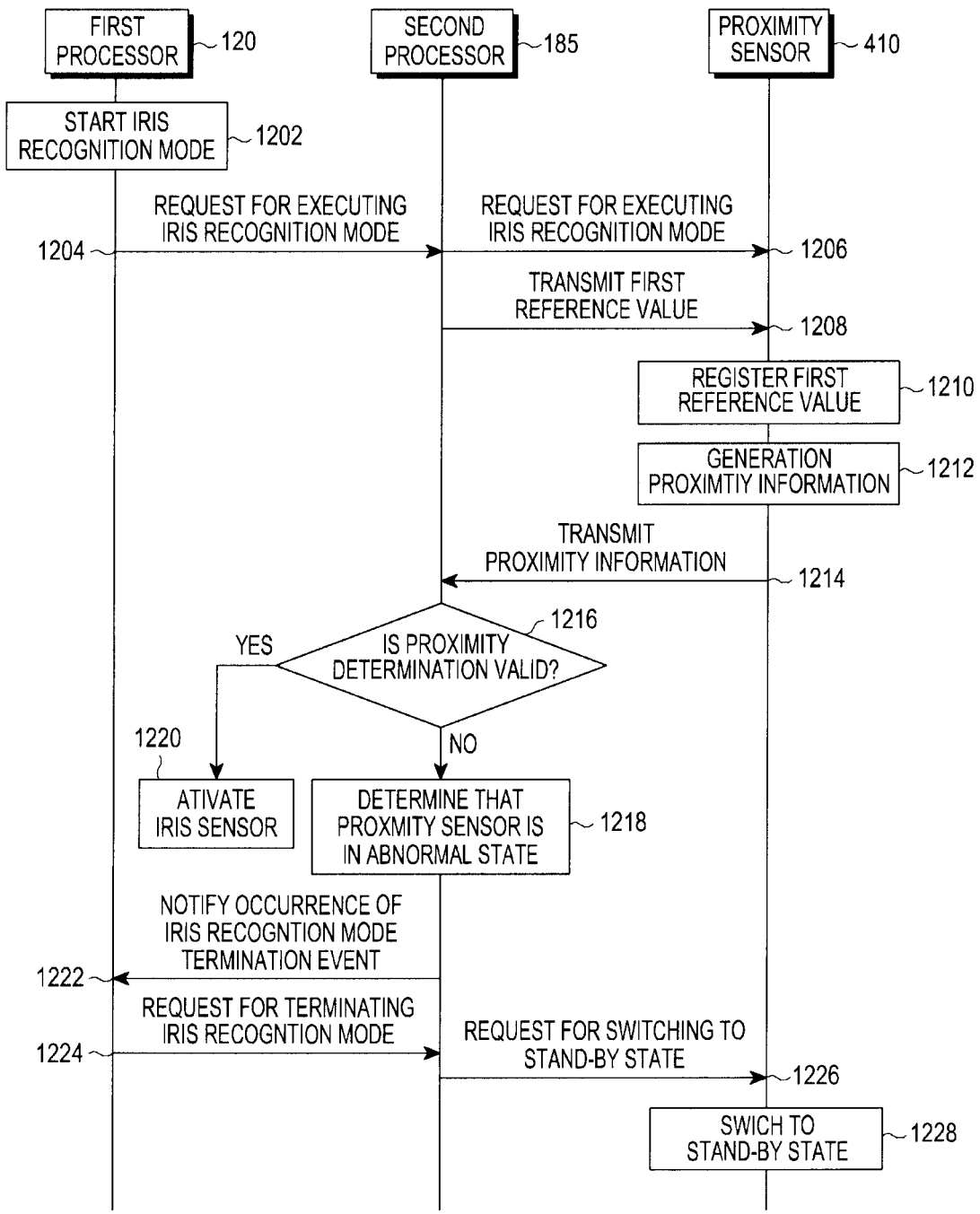
FIG. 12 is a flowchart illustrating an operation method of an electronic device according to various embodiments.

FIG. 12 is a flowchart illustrating an operation method of an electronic device according to various embodiments.

Referring to FIG. 12, the first processor 120 starts the iris recognition mode for iris recognition in operation 1202. In operation 1204, the first processor 120 sends a request for executing the iris recognition mode to the second processor 185. The second processor 185 having received the request for executing the iris recognition mode transmits the request for executing the iris recognition mode to the proximity sensor 410 in operation 1206, and transmits the first reference value to be used in the iris recognition mode to the proximity sensor 410 in operation 1208. The proximity sensor 410 registers the reference value therein in operation 1210, and generates the proximity information in operation 1212. In operation 1214, the proximity sensor 410 transmits the proximity information to the second processor 185.

According to an embodiment, the proximity sensor 410 generates a level value (e.g., 0-200) into which the amount of light received by the light-receiving unit 712 is converted, as the proximity information in operation 1212, and transmits the proximity information to the second processor 185 in operation 1214. According to an embodiment, the proximity sensor 410 may transmit information indicating a current state of the proximity sensor 410 (e.g., on/off and error occurrence of the proximity sensor 410, etc.), for example, state information, together with the proximity information, to the second processor 185 in operation 1214.

In operation 1216, the second processor 185 determines whether proximity determination by the proximity sensor 410 is valid. According to an embodiment, the second processor 185 may determine whether the proximity determination by the proximity sensor 410 is valid by determining whether the proximity sensor 410 is operable normally based on the proximity information received from the proximity sensor 410 or the state information indicating the current state of the proximity sensor 410.

When the proximity determination by the proximity sensor 410 is valid as a result of determination in operation 1216 (1216: YES), the second processor 185 activates the iris sensor 420 in operation 1220. According to an embodiment, in operation 1220, the second processor 185 executes operation 1126 of FIG. 11, and the iris sensor 420 performs at least one of operations 1144-1 through 1144-M.

When the proximity determination by the proximity sensor 410 is not valid as a result of determination in operation 1216 (1216: NO), the second processor 185 determines in operation 1218 that the proximity sensor 410 is in an abnormal state (e.g., an error state). A case where the proximity sensor 410 is abnormal may be one of iris recognition mode termination events. In operation 1222, the first processor 185 notifies the first processor 120 of occurrence of the iris recognition mode termination event. In operation 1222, the second processor 185 notifies the first processor 120 of the error state of the proximity sensor 410. The first processor 120 having received a report of the error state of the proximity sensor 410 in operation 1222 transmits the request for terminating the iris recognition mode to the second processor 185 in operation 1224. In operation 1226, the second processor 185 sends a request for switching to the stand-by state to the proximity sensor 410. In operation 1228, the proximity sensor 410 switches to the stand-by state. According to an embodiment, the second processor 120 requests turning-off of the proximity sensor 410 to control the proximity sensor 410 to be turned off in operation 1226. In FIG. 12, since it is determined that the proximity sensor 410 is in the abnormal state, the iris sensor 420 may maintain the stand-by state or may be turned off.

As such, when the proximity sensor 410 capable of measuring the distance between the electronic device 101 and the object is in the abnormal state, the electronic device 101 may not drive the light-emitting unit (e.g., the IR LED) of the iris sensor 420 or may not drive the iris sensor 420. When an error occurs in the proximity sensor 410, the proximity sensor 410 may not be able to correctly measure a distance between the electronic device 101 and the object. Once the proximity sensor 410 measures the distance between the electronic device 101 and the object wrong, the light-emitting unit (e.g., the IR LED) of the iris sensor 420 outputs light for scanning the iris even though the measured distance is inappropriate for activating the iris sensor 420 (for example, 20 cm or less), resulting in damage to the user's eye. However, when the electronic device 101 operates as described in the embodiment of FIG. 12, it is possible to prevent the user's eye from being damaged by the error of the proximity sensor 410.

According to an embodiment, when any proximity information is not delivered from the proximity sensor 410 to the second processor 185 during preset time (e.g., 400 ms) or more after operation 1208, the second processor 185 determines, as in operation 1218, that the proximity sensor 410 is in the abnormal state or is turned off. Thereafter, the electronic device 101 performs operation 1222 or 1224.

Figure 13A:
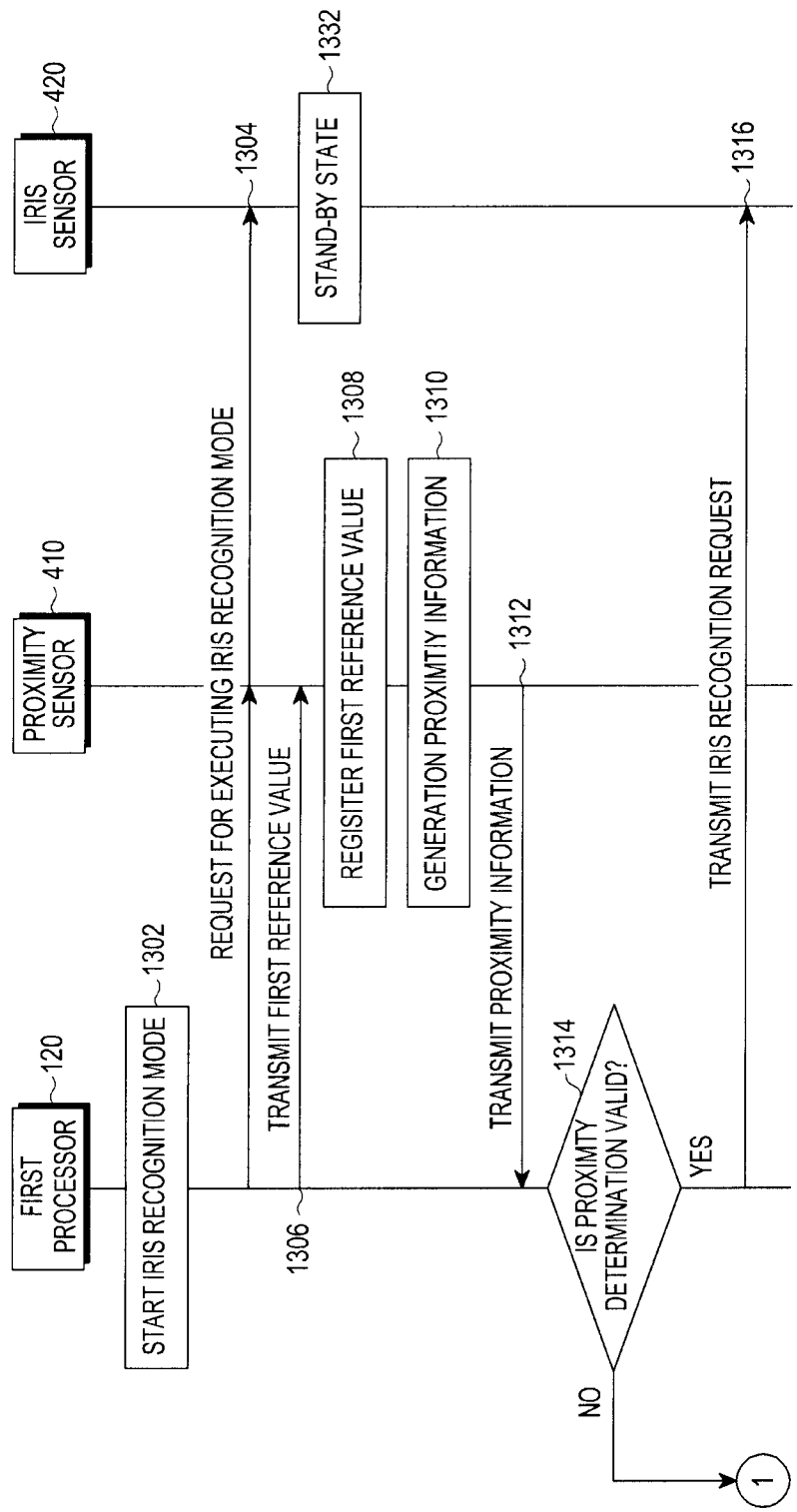
FIGS. 13A and 13B are flowcharts of an operation method of an electronic device according to various embodiments.
Figure 13B:
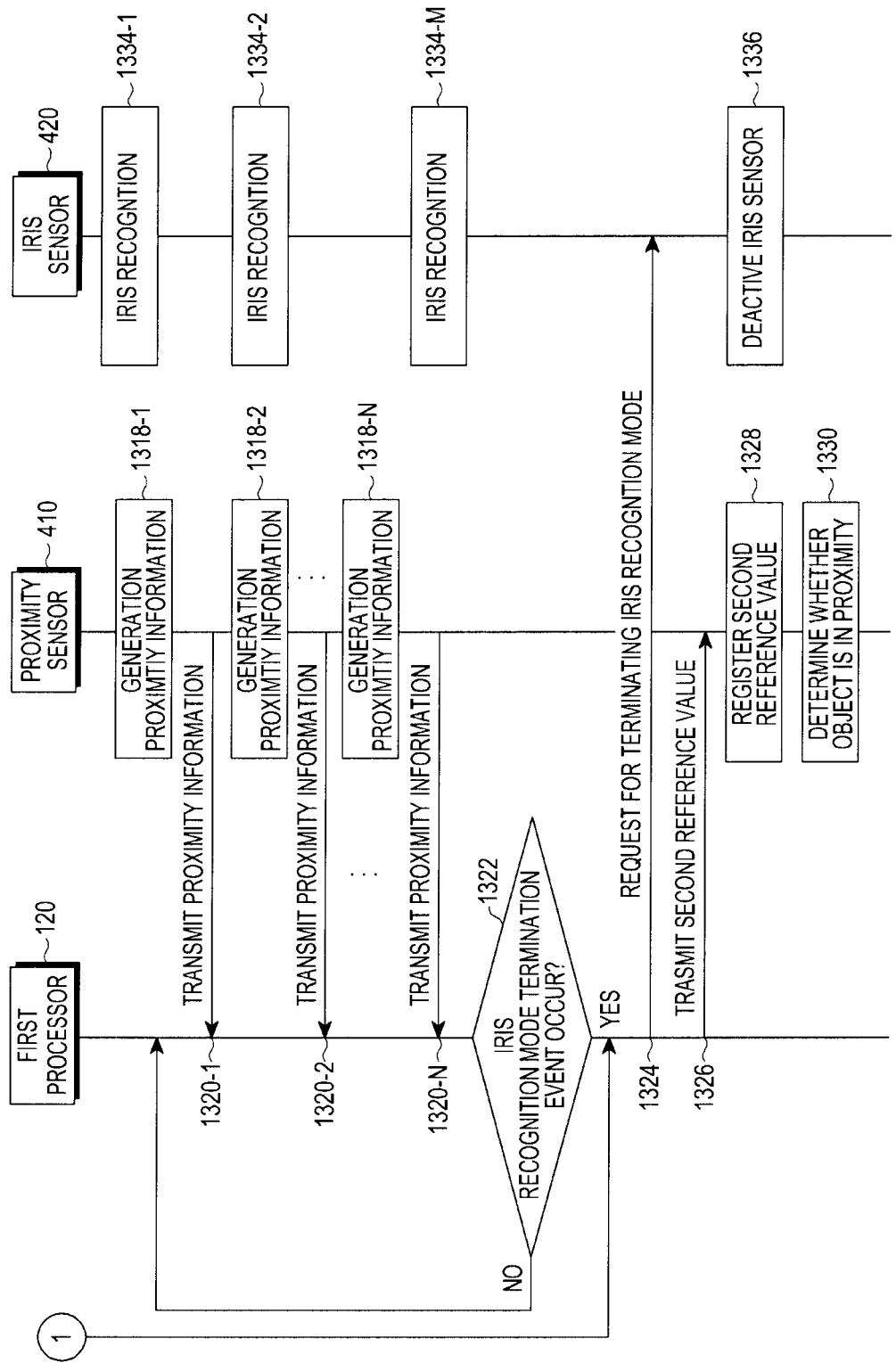

FIGS. 13A and 13B are flowcharts of an operation method of an electronic device according to various embodiments. In an embodiment of FIGS. 13A and 13B, the second processor 185 may be implemented in a form included in the first processor 120.

Referring to FIG. 13A, the first processor 120 starts the iris recognition mode in operation 1302. According to an embodiment, the first processor 120 determines to execute the iris recognition mode when the electronic device 101 is released from the sleep mode, the lock mode is executed, or user authentication is needed.

In operation 1304, the second processor 120 sends the request for executing the iris recognition mode to the iris sensor 420. The iris sensor 420 having received the request maintains the stand-by state in operation 1332.

In operation 1306, the first processor 120 transmits the first reference value for determining proximity in the iris recognition mode to the proximity sensor 410. In operation 1308, the proximity sensor 410 registers the first reference value received from the first processor 120 therein. In operation 1310, the proximity sensor 410 generates the proximity information. In operation 1312, the proximity sensor 410 transmits the generated proximity information to the first processor 120. According to an embodiment, the proximity sensor 410 may transmit the information indicating the current state of the proximity sensor 410 (e.g., on/off and error occurrence of the proximity sensor 410, etc.), for example, state information, together with the proximity information, to the second processor 185 in operation 1312.

In operation 1314, the first processor 120 determines whether proximity determination by the proximity sensor 410 is valid. Like the second processor 185 in FIGS. 11A and 11B, the first processor 120 may determine whether the proximity sensor 410 is operable normally by determining whether the proximity information is valid. According to an embodiment, the second processor 185 may determine whether the proximity determination by the proximity sensor 410 is valid by determining whether the proximity sensor 410 is operable normally based on the proximity information received from the proximity sensor 410 or the state information indicating the current state of the proximity sensor 410.

Referring to FIGS. 13A and 13B, when the proximity determination by the proximity sensor 410 is not valid as a result of determination in operation 1314 (1314: NO), the first processor 120 goes to operation 1324 to send the request for terminating the iris recognition mode to the iris sensor 420 in operation 1324. In operation 1336, the iris sensor 420 is deactivated.

Referring to FIGS. 13A and 13B, when the proximity determination by the proximity sensor 410 is valid as a result of determination in operation 1314 (1314: YES), the first processor 120 goes to operation 1316 to send the iris recognition request to the iris sensor 420 in operation 1316. The iris sensor 420 performs infrared scanning with respect to the iris of the user of the electronic device 101 by using the IR LED of the light-emitting unit 721 and the IR camera of the light-receiving unit 722, and detects the user's iris from the scan image, thereby performing iris recognition. The iris sensor 420 may perform iris recognition by performing operations 1334-1, 1334-2, ..., operation 1334-M every preset time (e.g., 30 ms).

Referring to FIGS. 13A and 13B, when the proximity determination by the proximity sensor 410 is valid as a result of determination in operation 1314 (1314: YES), the proximity sensor 410 generates proximity information by performing operation 1318-1, operation 1318-2, ..., operation 1318-N every preset time (e.g., 10 ms), and transmits the proximity information generated in each of operations 1318-1 through 1318-N to the second processor 185 by performing operations 1320-1, operation 1320-2, ..., operation 1320-N respectively, after operations 1318-1 through 1318-N.

In operation 1322, the first processor 120 determines whether the iris recognition mode termination event occurs based on the proximity information. According to an embodiment, the first processor 120 receives proximity information from the proximity sensor 410, N times during preset reference time (e.g., 300 ms) and determines whether the iris recognition mode termination event occurs based on the received proximity information. In this case, the iris recognition mode termination event may include a case where the distance between the electronic device 101 and the object is less than or equal to the first reference value. For example, the iris recognition mode termination event may include a case where the latest proximity information indicates that the distance between the electronic device 101 and the object is less than or equal to the first reference value or a case where the distance between the electronic device 101 and the object is less than or equal to the first reference value N/2 times during the reference time (e.g., 300 ms).

When the iris recognition mode termination event does not occur as a result of determination of operation 1322 (1322: NO), the proximity sensor 410 performs at least one of operations 1318-1 through 1318-N of generating proximity information and at least one of operations 1320-1 through 1320-N of transmitting the proximity information. The iris sensor 420 may also perform at least one of operations 1334-1 through operation 1334-M of recognizing an iris.

When the iris recognition mode termination event occurs as the result of determination of operation 1322 (1322: YES), the first processor 120 transmits the iris recognition mode termination request to the iris sensor 420 in operation 1324. The iris sensor 420 having received the iris recognition mode termination request is deactivated in operation 1336. Deactivation of the iris sensor 420 in operation 1336 may mean that the iris sensor 420 maintains the stand-by state or the iris sensor 420 is turned off.

According to an embodiment, after operation 1324, the first processor 120 determines the second reference value (e.g., 3 cm) for determining proximity of the object, and transmits the second reference value to the proximity sensor 410 in operation 1326. The proximity sensor 410 registers the second reference value therein in operation 1328, and determines proximity of the object by using the second reference value in operation 1330.

According to another embodiment, the proximity information generated by the proximity sensor 410 during execution of iris recognition by the iris sensor 420 may indicate that the distance between the electronic device 101 and the object is less than or equal to the first reference value. In this case, the first processor 120 may control the electronic device 101 to output guide data for activating the iris sensor 420 for an iris recognition operation of the iris sensor 420. The guide data may be a message displayed through the display 160 or voice data output through the speaker 282.

Figure 14:
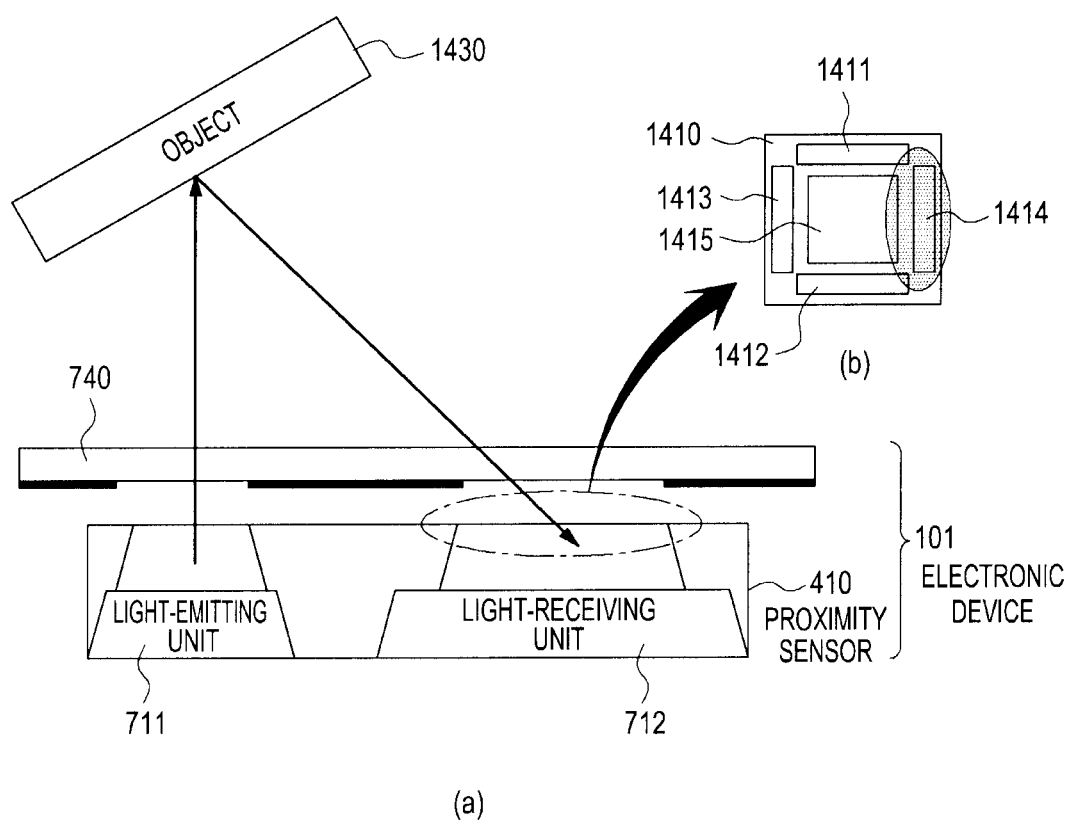
FIG. 14 illustrates another example of a proximity sensor included in an electronic device according to various embodiments.

FIG. 14 illustrates an example of a proximity sensor included in an electronic device according to various embodiments.

Referring to FIG. 14A, the proximity sensor 410 of the electronic device 101 may be installed under the transparent housing 740 and may include the light-emitting unit 711 and the light-receiving unit 712. The proximity sensor 410 illustrated in FIG. 14 may have a structure similar to and may perform an operation similar to the proximity sensor 410 illustrated in FIG. 7. In FIG. 14, the light-receiving unit 712 of the proximity sensor 410 and an illumination sensor 1415 are included in a sensor package 1410. As in FIG. 14, the light-receiving unit 710 of the proximity sensor 410 and the illumination sensor 1415 are arranged in adjacent to each other, thereby efficiently recognizing the amount or reflection direction of light reflected from an object 1430.

Referring to FIG. 14B, the light-receiving unit 712 of the proximity sensor 410 may include first through fourth channels 1411, 1412, 1413, and 1414 through which the light reflected from the object 1430 is received.

As shown in FIG. 14A, when the object 1430 is located laterally with respect to the proximity sensor 410 of the electronic device 101, the amount of light input to the four channels 1411 through 1414 of the light-receiving unit 712 may differ from channel to channel. Referring to FIG. 14A, the light reflected from the object 1430 is input inclinedly toward a right side of the light-receiving unit 712. Referring to FIG. 14B, the light input to the light-receiving unit 712 is input intensively to the fourth channel 1414 among the four channels 1411 through 1414 of the light-receiving unit 712.

According to an embodiment, the illumination sensor 1415 may include multiple red channels, multiple green channels, multiple blue channels, and multiple clear channels. The illumination sensor 1415 determines an incident angle of light incident to the light-receiving unit 712 by using channels inside the illumination sensor 1415. For example, the amount of light input to each of the red channel, the green channel, the blue channel, and the clear channel may differ according to a position of the channel. The first processor 120 or the second processor 185 predicts an incident angle of light input to the light-receiving unit 712 of the proximity sensor 410 based on a position of a channel having a high amount of light among the red channel, the green channel, the blue channel, and the clear channel. When the incident angle of the light input to the light-receiving unit 712 of the proximity sensor 410 is greater than a preset reference value, the proximity information about the object 1430 may be ignored by the first processor 120 or the second processor 185.

Figure 15:
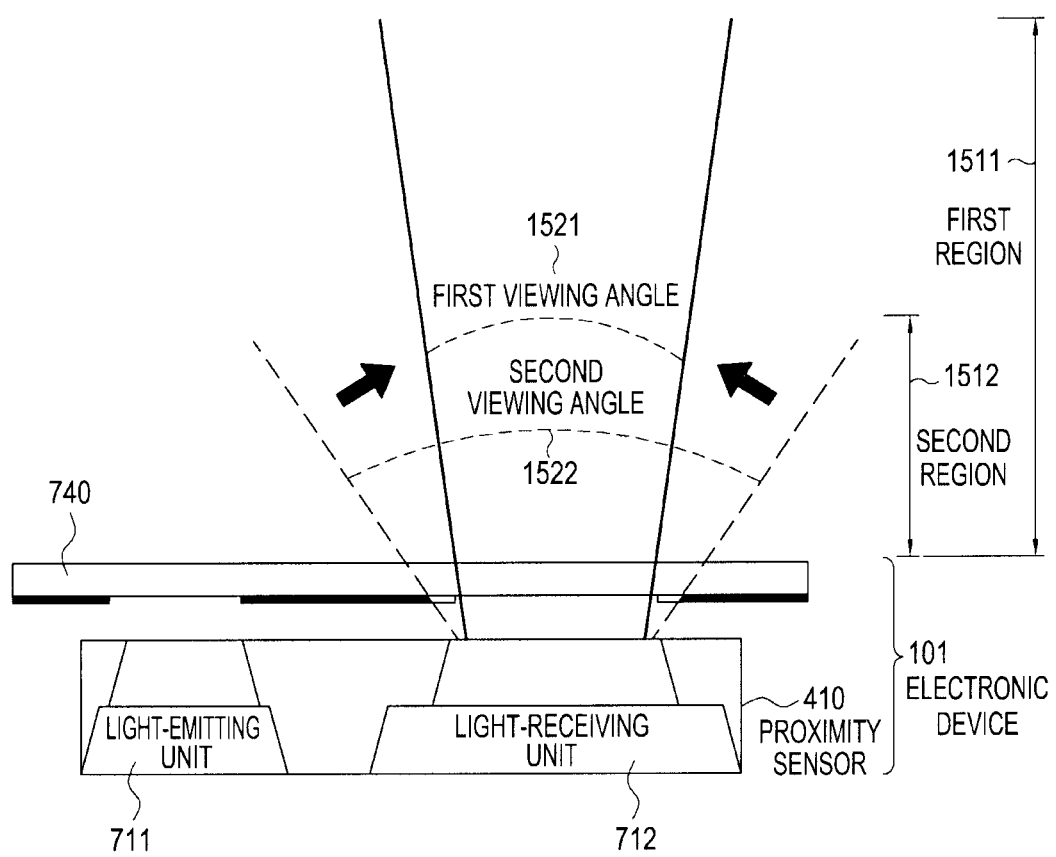
FIG. 15 illustrates a light-receiving range of a proximity sensor included in an electronic device according to various embodiments.

FIG. 15 illustrates a light-receiving range of a proximity sensor included in an electronic device according to various embodiments.

Referring to FIG. 15, when the electronic device 101 determines activation of the iris sensor 420 for iris recognition, the viewing angle of the light-receiving unit 712 included in the proximity sensor 410 may be a first viewing angle 1521. In this case, the proximity sensor 410 determines proximity of the object by using the first reference value (e.g., 20 cm). The proximity sensor 410 generates proximity information about the object approaching the electronic device 101 in a range of the first viewing angle 1521 in the iris recognition mode. When the electronic device 101 determines to deactivate the iris sensor 420, the proximity sensor 410 determines proximity of the object by using the second reference value (e.g., 3 cm). When the proximity sensor 410 determines proximity of the object by using the second reference value, the viewing angle of the light-receiving unit 712 included in the proximity sensor 410 may be a second viewing angle 1522.

As shown in FIG. 15, corresponding to a case where activation of the iris sensor 420 is determined and a case where deactivation of the iris sensor 420 is determined, different viewing angles are applied to the proximity sensor 410, and the proximity sensor 410 operates correspondingly. According to an embodiment, when activation of the iris sensor 420 is determined, the proximity sensor 410 generates proximity information about an object sensed in a range of a first viewing angle 1521 in a first region 1511 and delivers the proximity information to the first processor 120 or the second processor 185. When deactivation of the iris sensor 410 is determined, the proximity sensor 410 generates proximity information about an object sensed in a range of a second viewing angle 1522 in a second region 1512 and delivers the proximity information to the first processor 120 or the second processor 185.

Figure 16A:
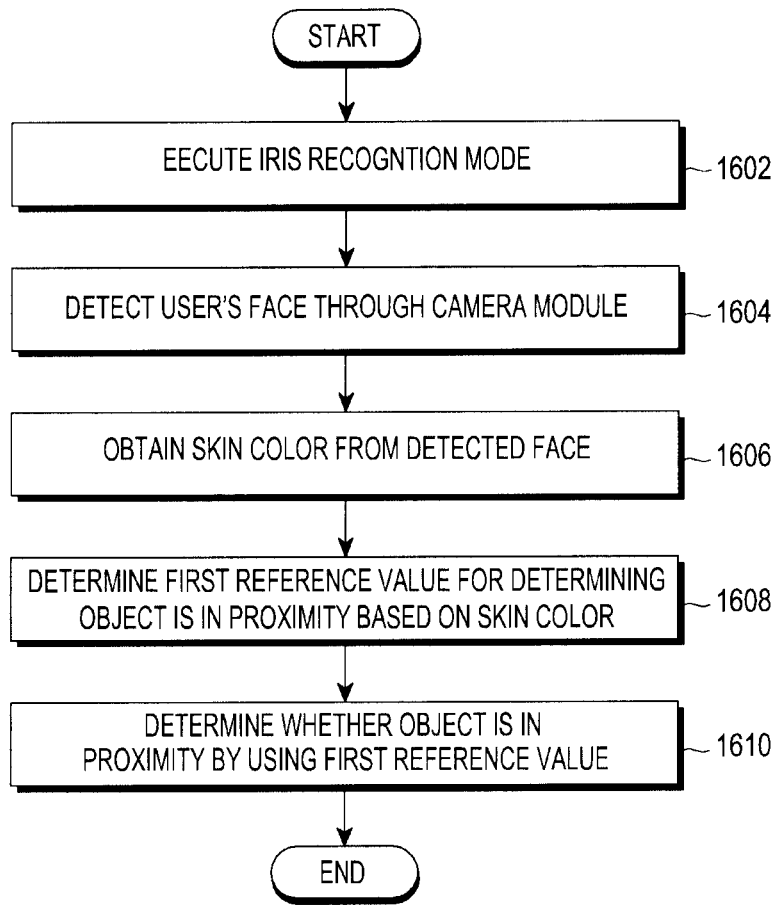
FIG. 16A is a flowchart illustrating an operation method of an electronic device according to various embodiments.

FIG. 16A is a flowchart illustrating an operation method of an electronic device according to various embodiments.

Referring to FIG. 16A, when the iris recognition mode is executed, for example, an event for activating the iris sensor 420 occurs in operation 1602, the electronic device 101 detects a user's face by using the camera module 291 in operation 1604. According to an embodiment, the electronic device 101 captures an image of the user through a front camera (not shown) or a rear camera (not shown) included in the electronic device 101 and detects a user's face image from the captured image.

The electronic device 101 obtains a skin color from the detected user's face image in operation 1606. In operation 1608, the electronic device 101 determines the first reference value for determining whether the object is in proximity based on the obtained skin color.

In operation 1610, the first processor 120 of the electronic device 101 determines whether the object sensed by the proximity sensor 410 is in proximity to the electronic device 101 by using the first reference value determined in operation 1608. According to an embodiment, in operation 1610, the proximity sensor 410 may compare the first reference value with the proximity information generated by the proximity sensor 410 to determine proximity of the object. According to an embodiment, the first reference value determined in operation 1608 is stored in the memory 130, and thereafter, upon occurrence of the event for activating the iris sensor 420, the first reference value may be used to determine whether the object is in proximity using the proximity sensor 410. That is, when the first reference value is previously stored in the memory 130, operations 1604 through 1608 may be omitted.

Figure 16B:
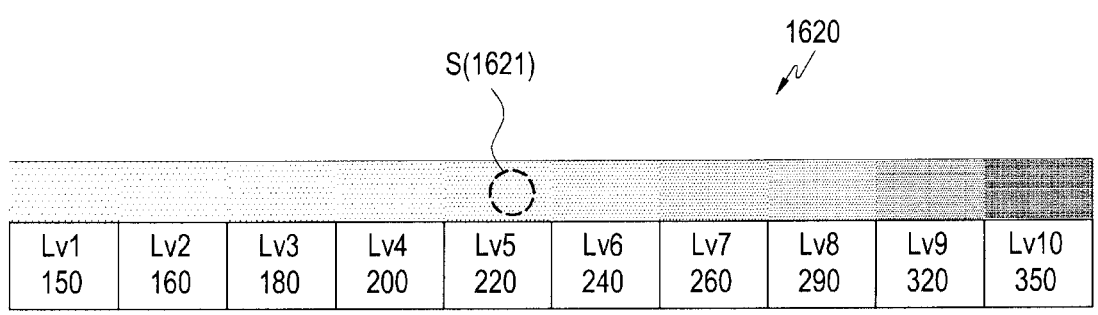
FIG. 16B illustrates an example of a skin color available in the operation method of FIG. 16A.

FIG. 16B illustrates an example of a skin color available in the operation method of FIG. 16A. Referring to FIGS. 16A and 16B, the skin color obtained in operation 1606 may be, for example, one of colors shown in a table 1620 of FIG. 16B. The electronic device 101 may determine a threshold value related to the most similar color among the colors shown in the table 1620 of FIG. 16B as the first reference value for determining whether the object is in proximity. For example, assuming that the skin color obtained in operation 1606 corresponds to S 1621, the first processor 120 or the second processor 185 of the electronic device 101 may select 220 of Lv5 as the first reference value for determining whether the object is in proximity.

Figure 17:
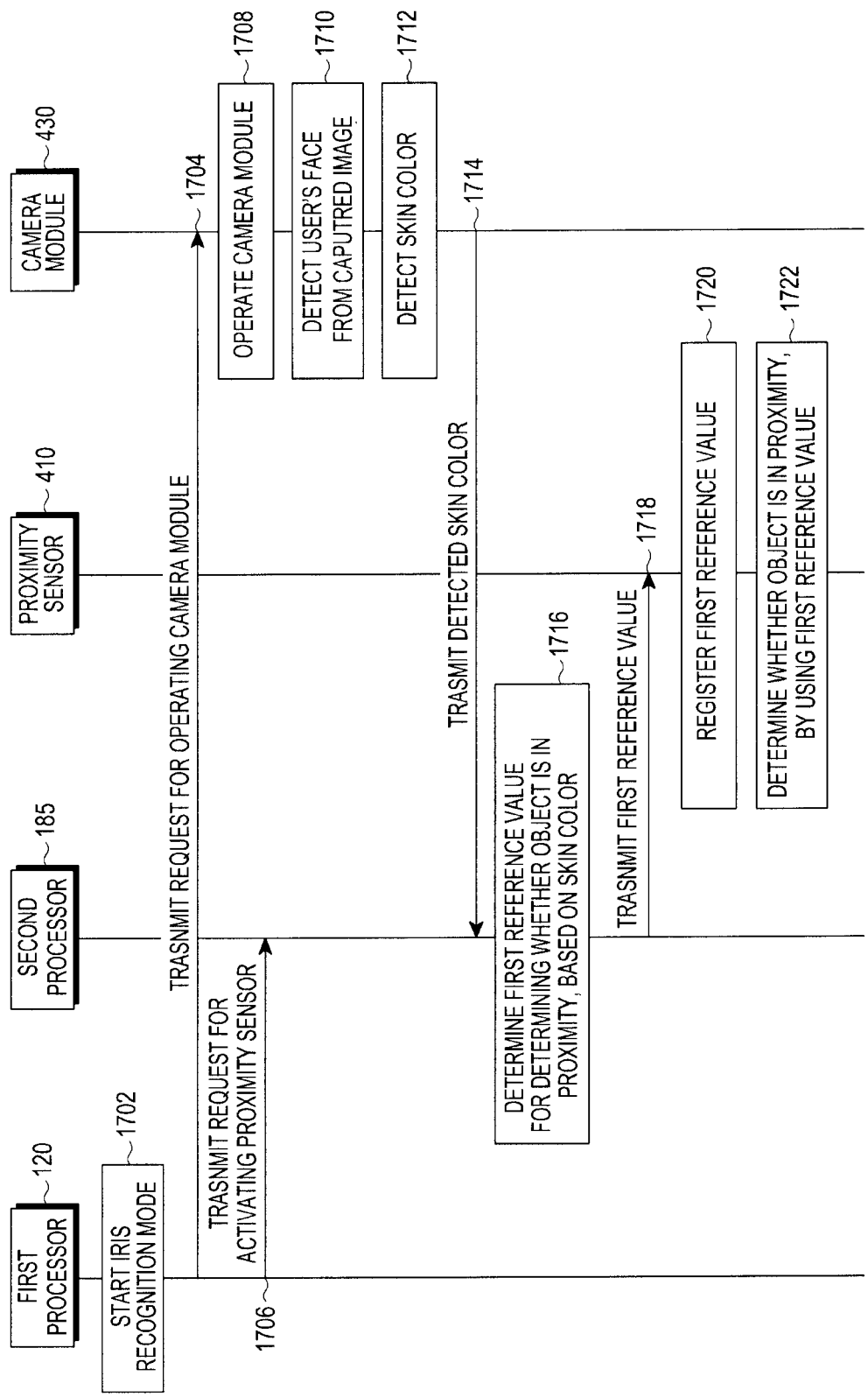
FIG. 17 is a flowchart illustrating an operation method of an electronic device according to various embodiments.

FIG. 17 is a flowchart illustrating an operation method of an electronic device according to various embodiments.

Referring to FIG. 17, in operation 1702, the first processor 120 of the electronic device 101 starts the iris recognition mode. According to an embodiment, once the event for activating the iris sensor 420 occurs, the first processor 120 may determine to execute the iris recognition mode.

In operation 1704, the first processor 120 transmits a request for operating the camera module 430 to the camera module 430. In operation 1706, the first processor 120 sends the request for activating the proximity sensor 410 to the second processor 185.

Once the execution request is sent from the first processor 120 in operation 1704, the camera module 430 may operate in response to the request in operation 1708. The camera module 430 in operation 1708 is turned on and receives an image from the outside through a lens included in the camera module 430. In operation 1710, the camera module 430 detects a user's face from the captured image. Once the user's face is detected, the camera module 430 detects a skin color of the user, e.g., a face color of the user in operation 1712.

In operation 1714, the camera module 430 transmits the skin color detected by the camera module 430 or information about the skin color to the second processor 185. In operation 1716, the second processor 185 determines the first reference value (e.g., 22 cm) for determining whether the object is in proximity in the iris recognition mode based on the skin color or the information about the skin color delivered from the camera module 430. Once the first reference value is determined in this way, the second processor 185 transmits the first reference value to the proximity sensor 410 in operation 1718. The proximity sensor 410 registers the first reference value therein in operation 1720. The proximity sensor 410 determines whether the object is in proximity, by using the registered first reference value in operation 1722. An operation after operation 1722 may be the same as or similar to at least one of operations 1114 through 1146 of FIG. 11.

According to an embodiment, the first reference value used in the iris recognition mode may be stored in advance in the memory 130 of the electronic device 101, and the first reference value may be input by the user. After the first reference value is set, even when the first processor 120 performs the iris recognition mode, at least one of operations 1704 through 1720 may be omitted.

When the electronic device 101 executes the iris recognition mode in this way (e.g., to perform iris authentication), the electronic device 101 may operate the camera module 430 as in operation 1708. According to an embodiment, the camera module 430 may include an RGB camera, and the first processor 120 or the second processor 185 of the electronic device 101 may obtain the user's skin color by using an image input to the camera module 430. In this case, the first processor 120 or the second processor 185 may obtain the user's skin color by using an eye sensing technique.

According to another embodiment, the camera module 430 may include an RGB camera, and the first processor 120 or the second processor 185 of the electronic device 101 may obtain the user's skin color by using an image captured using the camera module 430. Once the skin color is obtained, the light-emitting unit (e.g., the IR LED) and the light-receiving unit (e.g., the IR camera) of the iris sensor 420 may be driven. According to an embodiment, the photographing and the skin color obtaining may be performed as background operations of the electronic device 101. The background operation may mean an operation, an execution screen thereof is not displayed on the display 160, and during the photographing and the skin color obtaining using the camera module 430, the electronic device 101 displays a user interface (e.g., a UI, a UX, a switch VI) through the display 160.

According to an embodiment, in operation 1720, the electronic device 101 may obtain the user's skin color by using the camera module 430 while registering the first reference value in the proximity sensor 410. The electronic device 101 may register the first reference value and obtain the skin color at the same time as background operations. According to another embodiment, the electronic device 101 may obtain the user's skin color using the camera module 430 (e.g., the RGB camera) as a background operation, and then operates the iris sensor 420.

According to an embodiment, for example, in a smart stay operation, the electronic device 101 may obtain an average of skin colors of images that may be obtained using the camera module 430 or determine a first reference value by using the latest skin color among the skin colors obtained using the camera module 430.

According to an embodiment, the electronic device 101 may determine a user's skin color using a spectrometer. The electronic device 101 may be implemented in a form including the spectrometer. The spectrometer may obtain the skin color using a melanin pigment of the skin of the user, and the first processor 120 or the second processor 185 determines the first reference value based on the skin color obtained using the spectrometer.

According to an embodiment, the electronic device 101 may determine the first reference value to be used by the proximity sensor 410 in the iris recognition mode by using the user's skin color stored in advance in the electronic device 101, for example, the skin color obtained from user profile information or information about the skin color.

According to an embodiment, the electronic device 101 may obtain the user's skin color using a heart rate sensor. When the user wears a wearable device (e.g., the electronic device 102) connected with the electronic device 101, the wearable device may output a signal having a specific signal strength to the user and compare a user-reflected signal of the signal with a previously stored reference value to measure the user's skin color. For example, an LED of a PPG sensor is controlled to emit light to the maximum intensity, the amount of light reflected from the user's skin and then received through the light-receiving unit is measured, and a ratio of the amount of the light received through the light-receiving unit with respect to a maximum amount of light that may be received is obtained, such that the obtained ratio may be used as skin color information. The received light amount ratio may be compared with a received light amount ratio corresponding to the previously stored first reference value, and a skin color corresponding to a similar received light amount ratio may be determined as the skin color used for determination of the first reference value.

According to an embodiment, the electronic device 101 may determine a user's input, for example, user's skin color information or race information registered in a health application, or statistical skin colors based on countries or regions, as a skin color used to determine the first reference value used in the iris recognition mode.

An electronic device according to various embodiments of the present disclosure may include a proximity sensor configured to generate proximity information about an object approaching the electronic device, an iris sensor configured to detect an iris, and a first processor configured to control the electronic device, in which the first processor is further configured to determine a distance between the electronic device and the object based on the proximity information generated by the proximity sensor, and to detect the iris by using the iris sensor when the distance between the electronic device and the object is greater than a first reference value, and deactivate the iris sensor when the distance between the electronic device and the object is less than or equal to the first reference value.

According to an embodiment, the electronic device may further include a second processor configured to control the proximity sensor or the iris sensor, in which the proximity information indicates whether an amount of light input through a light-receiving unit of the proximity sensor is less than a preset second reference value, and the second processor is further configured to determine that the distance between the electronic device and the object is greater than the first reference value when the amount of the light is less than the second reference value based on the proximity information.

According to an embodiment, the second processor may be further configured to determine that the distance between the electronic device and the object is less than or equal to the first reference value when the amount of the light is greater than or equal to the second reference value based on the proximity information.

According to an embodiment, the second processor may be further configured to deactivate the iris sensor when the proximity information is not valid or when the proximity information is not delivered from the proximity sensor during a preset time or more.

According to an embodiment, the first processor may be further configured to maintain the iris sensor in a stand-by state upon occurrence of an event for activating the iris sensor and to drive the iris sensor to detect the iris when the proximity information generated by the proximity sensor is valid.

According to an embodiment, the electronic device may further include a camera configured to obtain a skin color of a user, in which the second processor is further configured to determine the first reference value based on the skin color.

According to an embodiment, the proximity sensor may sense an object approaching the electronic device within a first viewing angle, and the second processor may be further configured to drive the proximity sensor at a second viewing angle that is less than the first viewing angle when the distance between the electronic device and the object is equal to a first distance.

According to an embodiment, a light-receiving unit of the proximity sensor may further include an illumination sensor configured to measure the amount of the light input to the light-receiving unit, the illumination sensor may include four channels configured to receive the light input to the light-receiving unit, and the second processor may be further configured to determine whether the object is within the second viewing angle by using an amount of light input through each of the four channels.

According to an embodiment, the first processor may be configured to output guide data such that the distance between the electronic device and the object is greater than the first reference value when the distance between the electronic device and the object is less than or equal to the first reference value.

An operation method of an electronic device according to various embodiments of the present disclosure may include generating proximity information about an object approaching the electronic device by using a proximity sensor, determining a distance between the electronic device and the object based on the proximity information generated by the proximity sensor, and detecting the iris by using an iris sensor when the distance between the electronic device and the object is greater than a first reference value, and deactivating the iris sensor when the distance between the electronic device and the object is less than or equal to the first reference value.

According to an embodiment, the proximity information may indicate whether an amount of light input through a light-receiving unit of the proximity sensor is less than a preset second reference value, and the operation method may further include determining that the distance between the electronic device and the object is greater than the first reference value when the amount of the light is less than the second reference value based on the proximity information and determining that the distance between the electronic device and the object is less than or equal to the first reference value when the amount of the light is greater than or equal to the second reference value based on the proximity information.

According to an embodiment, the operation method may further include determining that the distance between the electronic device and the object is less than or equal to the first reference value when the amount of the light is greater than or equal to the second reference value based on the proximity information.

According to an embodiment, the operation method may further include deactivating the iris sensor when the proximity information is not valid or when the proximity information is not delivered from the proximity sensor during a preset time or more.

According to an embodiment, the deactivating of the iris sensor may include maintaining the iris sensor in a stand-by state, and the maintaining of the iris sensor in the stand-by state may include controlling a light-emitting unit of the iris sensor not to output a signal for detecting the iris or turning off the light-emitting unit and the light-receiving unit of the iris sensor.

According to an embodiment, the operation method may further include photographing a skin color of a user by using a camera and determining the first reference value based on the skin color.

According to an embodiment, the proximity sensor may sense an object approaching the electronic device within a first viewing angle, and may be driven at a second viewing angle that is less than the first viewing angle when the distance between the electronic device and the object is equal to a first distance.

According to an embodiment, a light-receiving unit of the proximity sensor may further include an illumination sensor configured to measure the amount of the light input to the light-receiving unit, the illumination sensor may include four channels configured to receive the light input to the light-receiving unit, and the determining of the distance between the electronic device and the object based on the proximity information generated by the proximity sensor may include determining whether the object is within the second viewing angle by using an amount of light input through each of the four channels.

According to an embodiment, the operation method may further include outputting guide data such that the distance between the electronic device and the object is greater than the first reference value when the distance between the electronic device and the object is less than or equal to the first reference value.

According to various embodiments, a storage medium having stored therein instructions for, when executed by at least one processor, causing the at least one processor to perform at least one operation including generating proximity information about an object approaching the electronic device by using a proximity sensor, determining a distance between the electronic device and the object based on the proximity information generated by the proximity sensor, and detecting the iris by using an iris sensor when the distance between the electronic device and the object is greater than a first reference value, and deactivating the iris sensor when the distance between the electronic device and the object is less than or equal to the first reference value.

According to various embodiments, a portable electronic device includes a housing, a touch screen display exposed through a surface of the housing, a proximity sensor arranged in adjacent to the display on the surface of the housing, an iris recognition sensor arranged in adjacent to the proximity sensor on the surface of the housing, a cellular wireless communication circuit arranged inside the housing, a processor electrically connected with the display, the proximity sensor, the iris recognition sensor, and the communication circuit, and a memory storing at least one application program for performing authentication by using the iris recognition sensor, in which the memory stores instructions for, when executed, causing the proximity sensor to determine whether an external object is in proximity based on a first distance to the proximity sensor when the processor performs authentication by using the iris recognition sensor during an operation of the application program, and causing the proximity sensor to determine whether the external object is in proximity based on the first distance from the proximity sensor when the processor performs phone communication by using the wireless communication circuit, and the first distance is greater than the second distance.

As used herein, the term module may include a unit implemented in hardware, software, or firmware, and may interchangeably be used with other terms, for example, logic, logic block, part, or circuitry. The module may be a single integral component, or a minimum unit or part thereof, adapted to perform one or more functions. The module may be implemented mechanically or electronically, and may include an application-specific integrated circuit (ASIC) chip, field-programmable gate arrays (FPGAs), and a programmable-logic device performing certain operations already known or to be developed. At least a part of an apparatus (e.g., modules or functions thereof) or a method (e.g., operations) according to various embodiments may be implemented with an instruction stored in a computer-readable storage medium (e.g., the memory 130) in the form of a programming module. When the instructions are executed by a processor (for example, the processor 120), the processor may perform functions corresponding to the instructions. The computer-readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), an embedded memory, and so forth. The instructions may include a code generated by a compiler or a code executable by an interpreter. Modules or programming modules according to various embodiments of the present disclosure may include one or more of the foregoing elements, have some of the foregoing elements omitted, or further include additional other elements. Operations performed by the module, the program, or another component according to various embodiments may be carried out sequentially, in parallel, repeatedly, or heuristically, or one or more of the operations may be executed in a different order or omitted, or one or more other operations may be added.

What is claimed is:

1. An electronic device comprising:
   a proximity sensor configured to generate proximity information about an object approaching the electronic device;
   a display;
   an iris sensor configured to detect an iris; and
   a first processor configured to control the electronic device,
   wherein the first processor is further configured to:
      in response to reception of a user input, control the display to display a lock screen and control the iris sensor to be activated,
      in a lock state that the lock screen is displayed on the display, determine a distance between the electronic device and the object based on the proximity information generated by the proximity sensor, and
      if the distance between the electronic device and the object is greater than a first reference value, detect the iris by using the activated iris sensor and release the lock state by using the detected iris, and if the distance between the electronic device and the object is less than or equal to the first reference value, control the activated iris sensor to be deactivated to maintain the lock state.

2. The electronic device of claim 1, further comprising a second processor configured to control the proximity sensor or the iris sensor,
   wherein the proximity information indicates whether an amount of light inputted through a light-receiving unit of the proximity sensor is less than a predetermined second reference value, and
   the second processor is further configured to determine that the distance between the electronic device and the object is greater than the first reference value if the amount of the light is less than the predetermined second reference value based on the proximity information.

3. The electronic device of claim 2, wherein the second processor is further configured to determine that the distance between the electronic device and the object is less than or equal to the first reference value if the amount of the light is greater than or equal to the predetermined second reference value based on the proximity information.

4. The electronic device of claim 2, wherein the second processor is further configured to deactivate the iris sensor if the proximity information is not valid or if the proximity information is not delivered from the proximity sensor during a predetermined time or more.

5. The electronic device of claim 1, wherein the first processor is further configured to:
  if an event for activating the iris sensor occurs, maintain the iris sensor in a stand-by state, and
  if the proximity information generated by the proximity sensor is valid, drive the iris sensor to detect the iris.

6. The electronic device of claim 2, further comprising a camera configured to obtain a skin color of a user,
  wherein the second processor is further configured to determine the first reference value based on the skin color.

7. The electronic device of claim 2, wherein the proximity sensor is configured to sense an object approaching the electronic device within a first viewing angle, and
  the second processor is further configured to drive the proximity sensor at a second viewing angle that is less than the first viewing angle if the distance between the electronic device and the object is equal to a third distance.

8. The electronic device of claim 7, wherein a light-receiving unit of the proximity sensor comprises an illumination sensor configured to measure the amount of the light inputted to the light-receiving unit,
  the illumination sensor comprises four channels configured to receive the light inputted to the light-receiving unit, and
  the second processor is further configured to determine whether the object is within the second viewing angle by using an amount of light inputted through each of the four channels.

9. The electronic device of claim 1, wherein the first processor is further configured to:
  if the distance between the electronic device and the object is less than or equal to the first reference value, output guide data such that the distance between the electronic device and the object is greater than the first reference value.

10. A method for controlling an operation of an electronic device, the method comprising:
  in response to reception of a user input, controlling a display to display a lock screen and controlling an iris sensor to be activated;
  in a lock state that the lock screen is displayed on the display, determining a distance between the electronic device and an object based on proximity information about the object approaching the electronic device generated by a proximity sensor; and
  if the distance between the electronic device and the object is greater than a first reference value, detecting an iris by using the activated iris sensor and releasing the lock state by using the detected iris, and if the distance between the electronic device and the object is less than or equal to the first reference value, controlling the activated iris sensor to be deactivated to maintain the lock state.

11. The method of claim 10, wherein the proximity information indicates whether an amount of light inputted through a light-receiving unit of the proximity sensor is less than a predetermined second reference value, and
  the method further comprises:
    if the amount of the light is less than the predetermined second reference value based on the proximity information, determining that the distance between the electronic device and the object is greater than the first reference value; and
    if the amount of the light is greater than or equal to the predetermined second reference value based on the proximity information, determining that the distance between the electronic device and the object is less than or equal to the first reference value.

12. The method of claim 11, further comprising deactivating the iris sensor if the proximity information is not valid or if the proximity information is not delivered from the proximity sensor during a predetermined time or more.

13. The method of claim 12, wherein deactivating the iris sensor comprises maintaining the iris sensor in stand-by state, and
  wherein maintaining the iris sensor in the stand-by state comprises controlling a light-emitting unit of the iris sensor not to output a signal for detecting the iris or turning off the light-emitting unit and a light-receiving unit of the iris sensor.

14. The method of claim 11, further comprising:
  photographing a skin color of a user by using a camera of the electronic device; and
  determining the first reference value based on the skin color.

15. The method of claim 11, wherein the proximity sensor is configured to sense the object approaching the electronic device within a first viewing angle, and is driven at a second viewing angle that is less than the first viewing angle if the distance between the electronic device and the object is greater than the first reference value.

16. The electronic device of claim 1, wherein, when detecting the iris, the proximity sensor is configured to generate the proximity information once every first interval, and the iris sensor is configured to detect the iris once every second interval.

17. The electronic device of claim 16, wherein the first interval is less than the second interval.

18. The method of claim 10, wherein the detecting of the iris further comprises:
  generating the proximity information by the proximity sensor once every first interval; and
  detecting the iris by the iris sensor once every second interval.

19. The method of claim 18, wherein the first interval is less than the second interval.

* * * * *